United States Patent
Kubota et al.

(10) Patent No.: US 11,016,355 B2
(45) Date of Patent: May 25, 2021

(54) LIQUID CRYSTAL LIGHT CONTROL APPARATUS AND METHOD FOR MANUFACTURING SAME

(71) Applicant: DAI NIPPON PRINTING CO., LTD., Tokyo (JP)

(72) Inventors: Hiroshi Kubota, Tokyo (JP); Yusuke Hagiwara, Tokyo (JP); Yasunori Hayashida, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/965,402

(22) PCT Filed: Jan. 28, 2019

(86) PCT No.: PCT/JP2019/002661
§ 371 (c)(1),
(2) Date: Sep. 11, 2020

(87) PCT Pub. No.: WO2019/151171
PCT Pub. Date: Aug. 8, 2019

(65) Prior Publication Data
US 2021/0072571 A1 Mar. 11, 2021

(30) Foreign Application Priority Data
Jan. 30, 2018 (JP) .............................. JP2018-013468

(51) Int. Cl.
*E06B 9/24* (2006.01)
*G02F 1/1345* (2006.01)
(Continued)

(52) U.S. Cl.
CPC ................ *G02F 1/137* (2013.01); *E06B 9/24* (2013.01); *G02F 1/13439* (2013.01);
(Continued)

(58) Field of Classification Search
CPC ..... G02F 1/13458; G02F 2001/133607; G02F 1/133606; G02F 1/133602;
(Continued)

(56) References Cited

U.S. PATENT DOCUMENTS

2009/0033814 A1* 2/2009 Khan .................... G02B 27/48
349/35
2009/0244415 A1* 10/2009 Ide ........................ G02F 1/1313
349/33

FOREIGN PATENT DOCUMENTS

| JP | 6120196 B1 | 4/2017 |
| JP | 6128269 B1 | 5/2017 |
| JP | 2017-097339 A | 6/2017 |

OTHER PUBLICATIONS

Apr. 16, 2019 International Search Report issued in International Patent Application No. PCT/JP2019/002661.

* cited by examiner

*Primary Examiner* — Michael H Caley
*Assistant Examiner* — Mariam Qureshi
(74) *Attorney, Agent, or Firm* — Oliff PLC

(57) ABSTRACT

A liquid crystal light control apparatus includes a liquid crystal light control film and power supply device that drives liquid crystal light control film. Liquid crystal light control film has a structure wherein liquid crystal layer is sandwiched between paired transparent electrode layers, and used by being adhered to a large transparent member. Power supply device supplies a predetermined AC voltage between terminals a and b of liquid crystal light control film. A condition $|Z0| \leq \alpha \times RF$ is set where RF is a DC resistance between terminals a and b of liquid crystal light control film, $|Z0|$ is an output impedance between terminals A and B of power supply device, and predetermined coefficient $\alpha = 0.2$. In order to protect power supply device, condition
(Continued)

Vp/Imax≤|Z0|≤α×RF is set where Vp is output peak voltage of power supply device and Imax is maximum allowable current.

12 Claims, 14 Drawing Sheets

(51) Int. Cl.
  *G02F 1/137* (2006.01)
  *G02F 1/1343* (2006.01)
(52) U.S. Cl.
  CPC .. *G02F 1/13458* (2013.01); *E06B 2009/2417* (2013.01); *E06B 2009/2464* (2013.01)
(58) Field of Classification Search
  CPC .......... G02F 2001/133614; G02F 2001/13756; G02B 6/005; G02B 6/0033; G02B 6/0063; F21V 14/00; E06B 2009/2417; E06B 2009/2464; E06B 9/24
  See application file for complete search history.

[Fig.1]
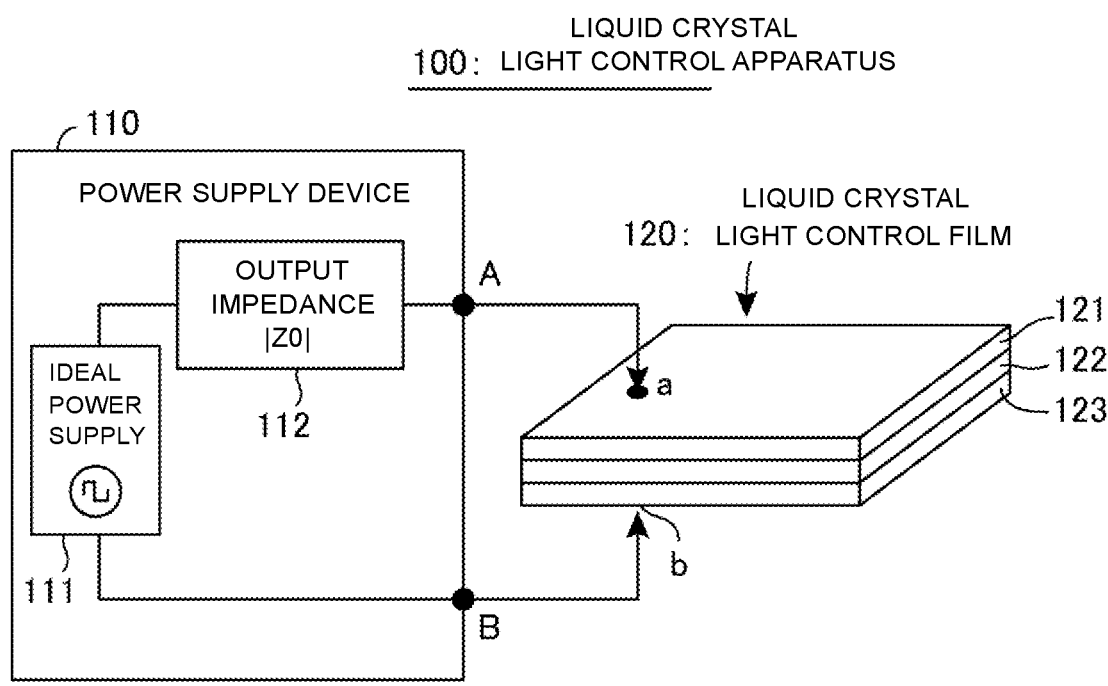

[Fig.2]
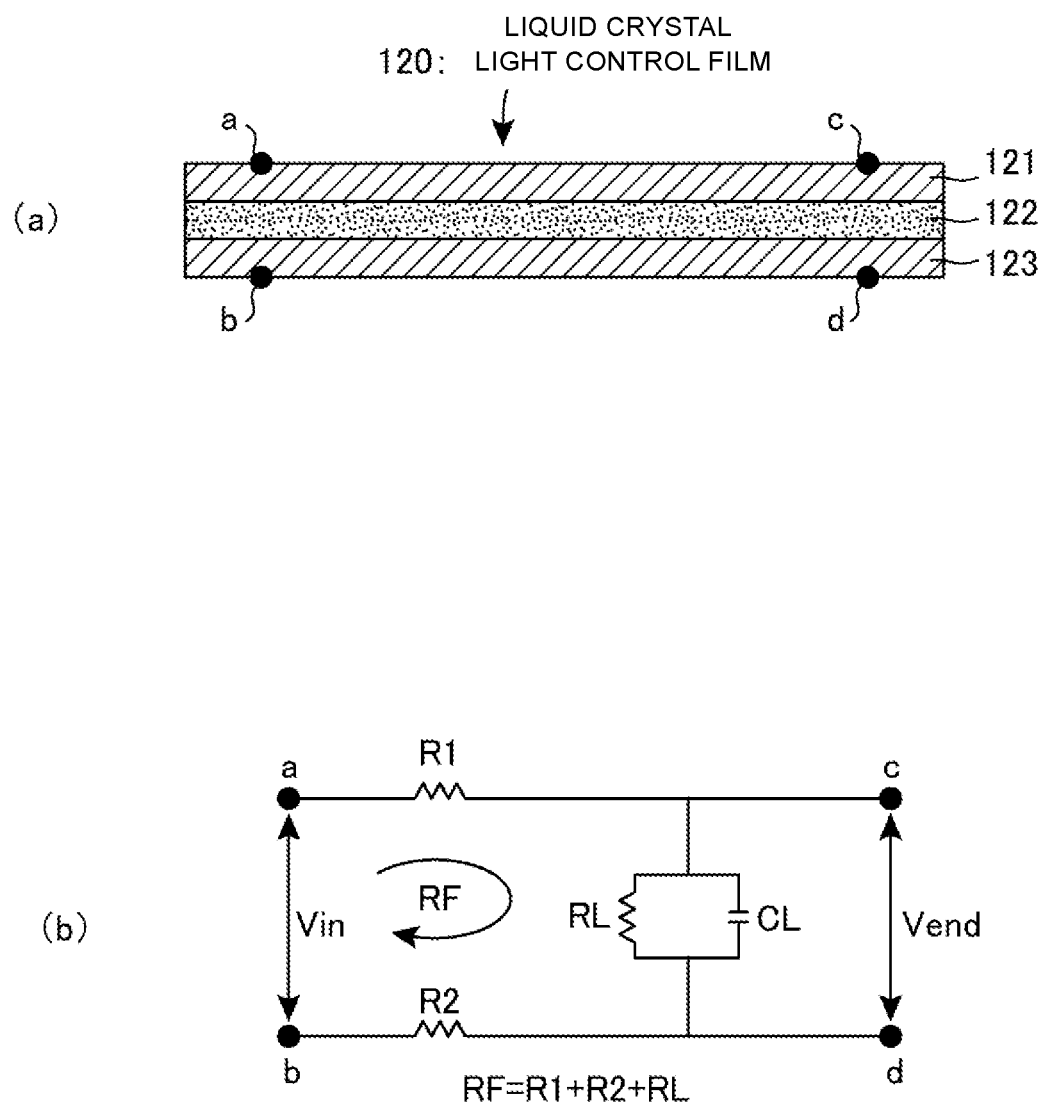

[Fig.3]
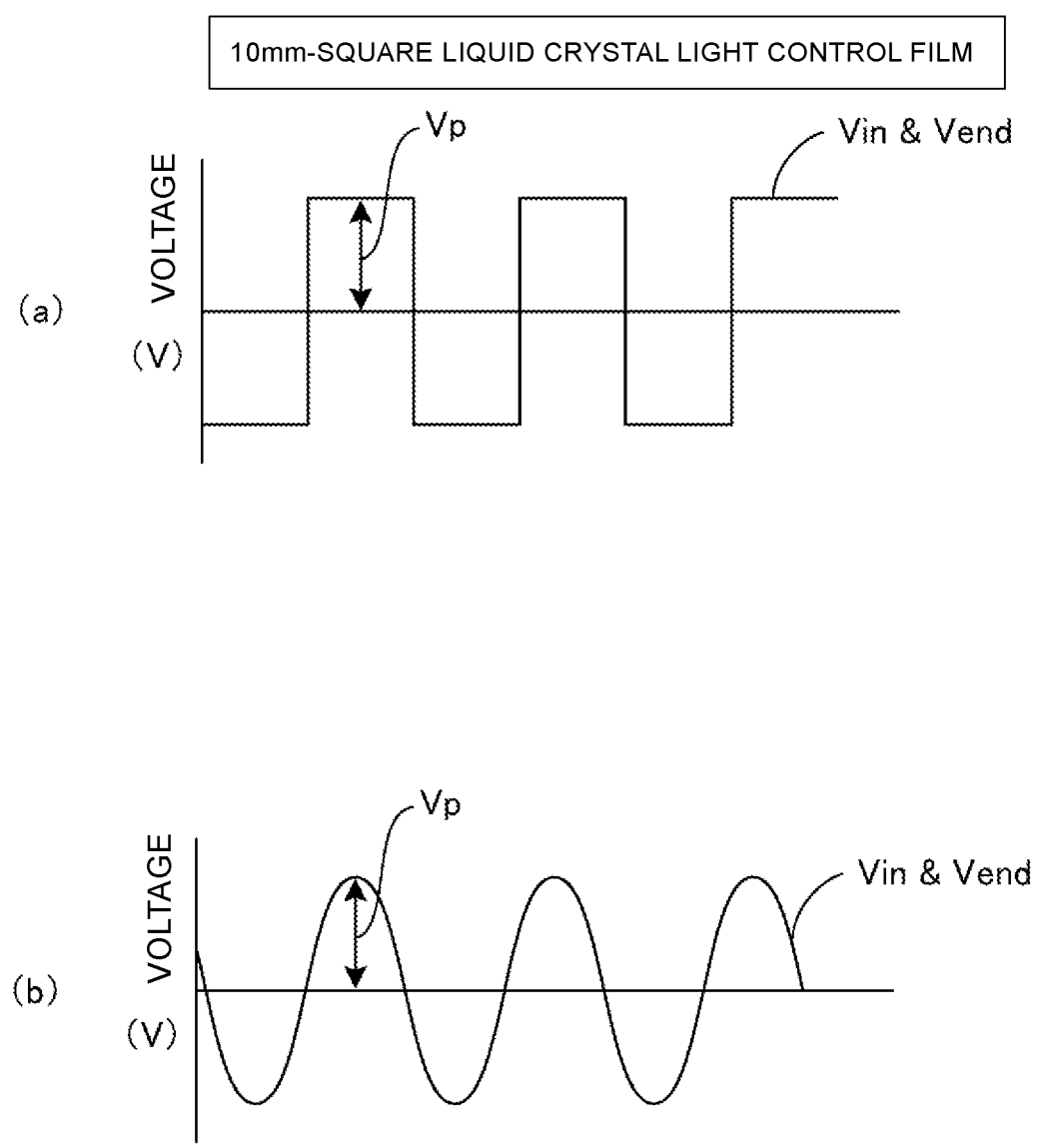

[Fig.4]
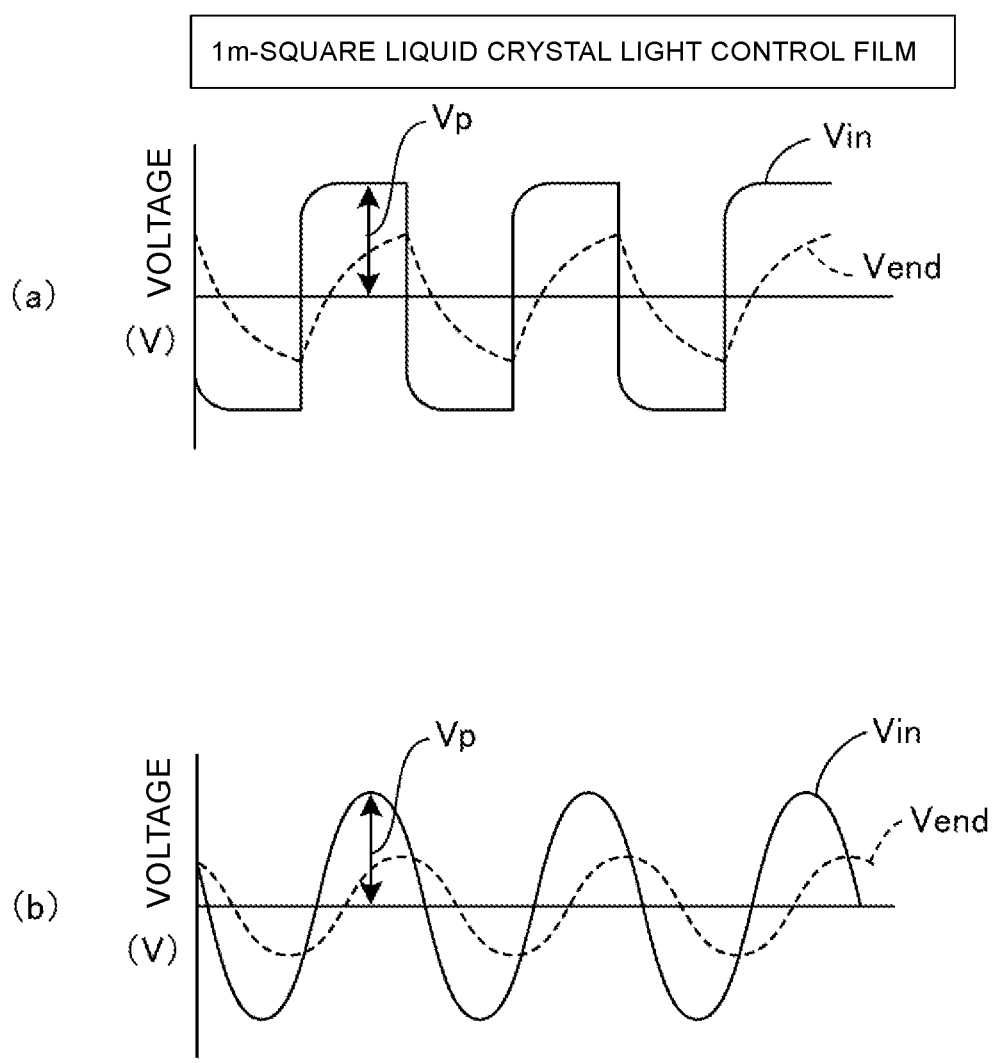

[Fig.5]
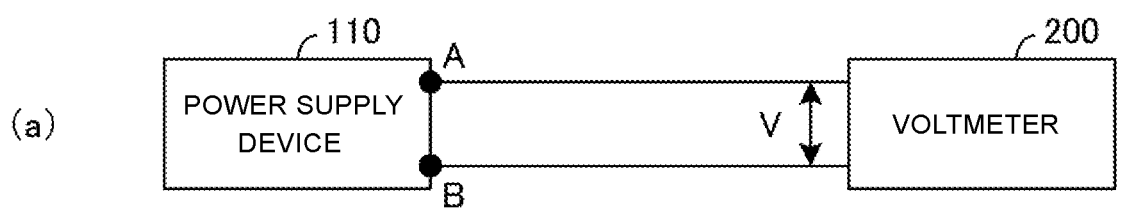
(a)
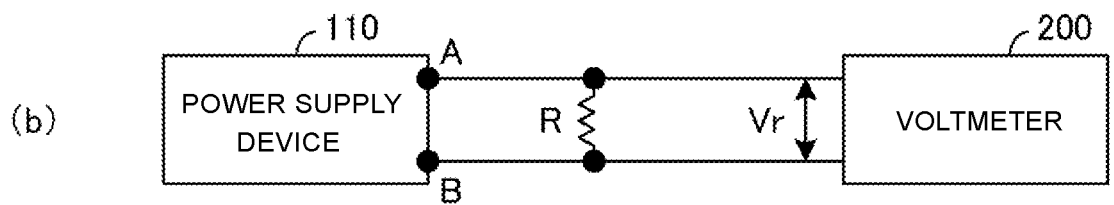
(b)
(c) $\quad \dfrac{Vr}{V} = \dfrac{R}{|Z0| + R}$

[Fig.6]
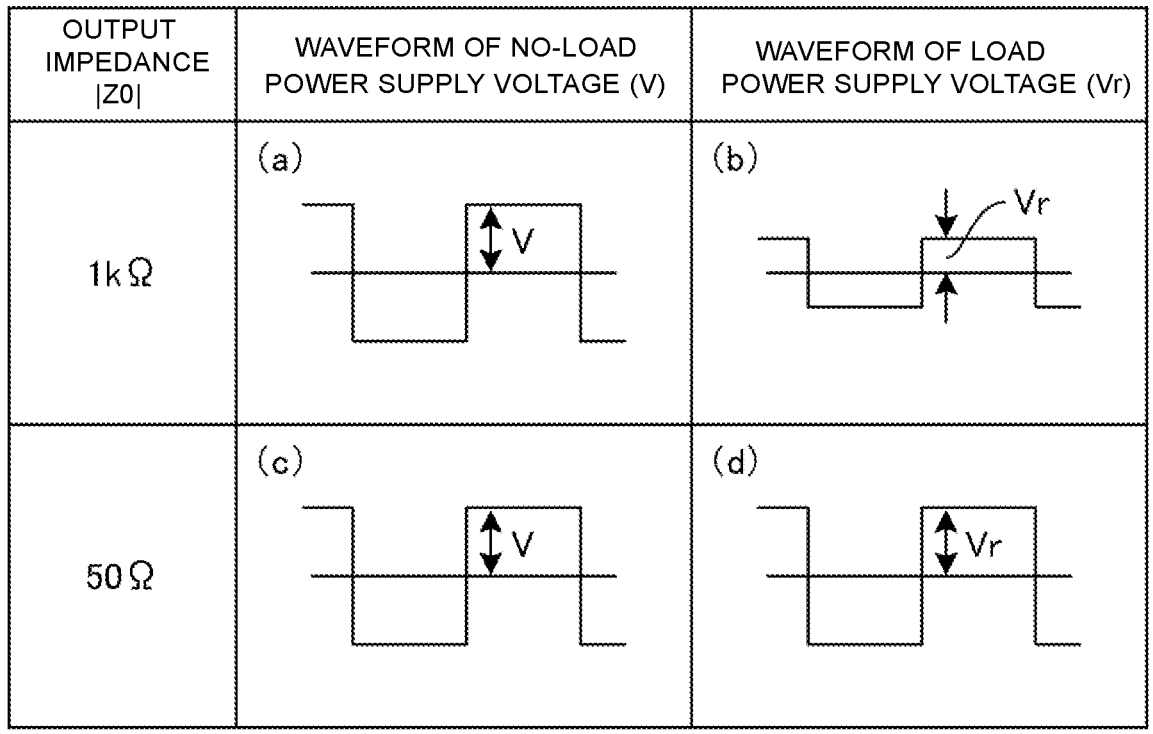
[Fig.7]
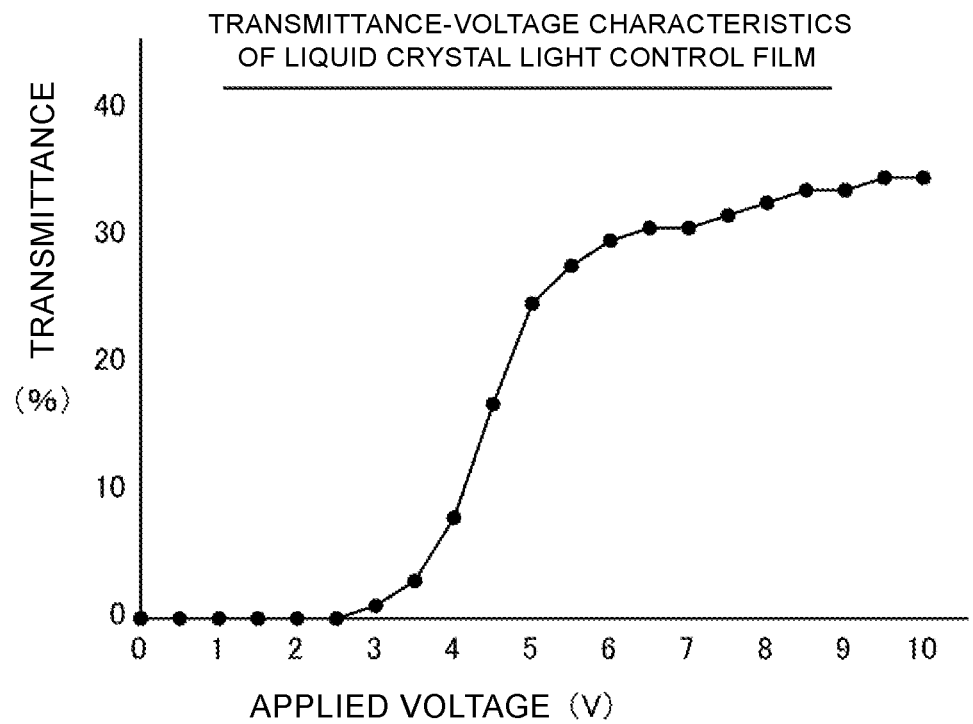

[Fig.8]

(a) $|Z0| \leqq \alpha \times RF$

- $|Z0|$: OUTPUT IMPETANCE OF POWER SUPPLY DEVICE 110
- $\alpha$: IDEAL VALUE IS MEASURED BY EXPERIMENT ($\alpha = 0.2$ or $\alpha = 0.05$)
- $RF$: DC RESISTANCE OF LIQUID CRYSTAL LIGHT CONTROL FILM ⇩ MEASURED AS ELECTRIC RESISTANCE BETWEEN TERMINALS a AND b in Fig.2

(b) $Vp / I\,max \leqq |Z0|$

- $Vp$: PEAK VOLTAGE
- $I\,max$: MAXIMUM ALLOWABLE CURRENT
- $|Z0|$: OUTPUT IMPETANCE OF POWER SUPPLY DEVICE 110

[Fig.9]
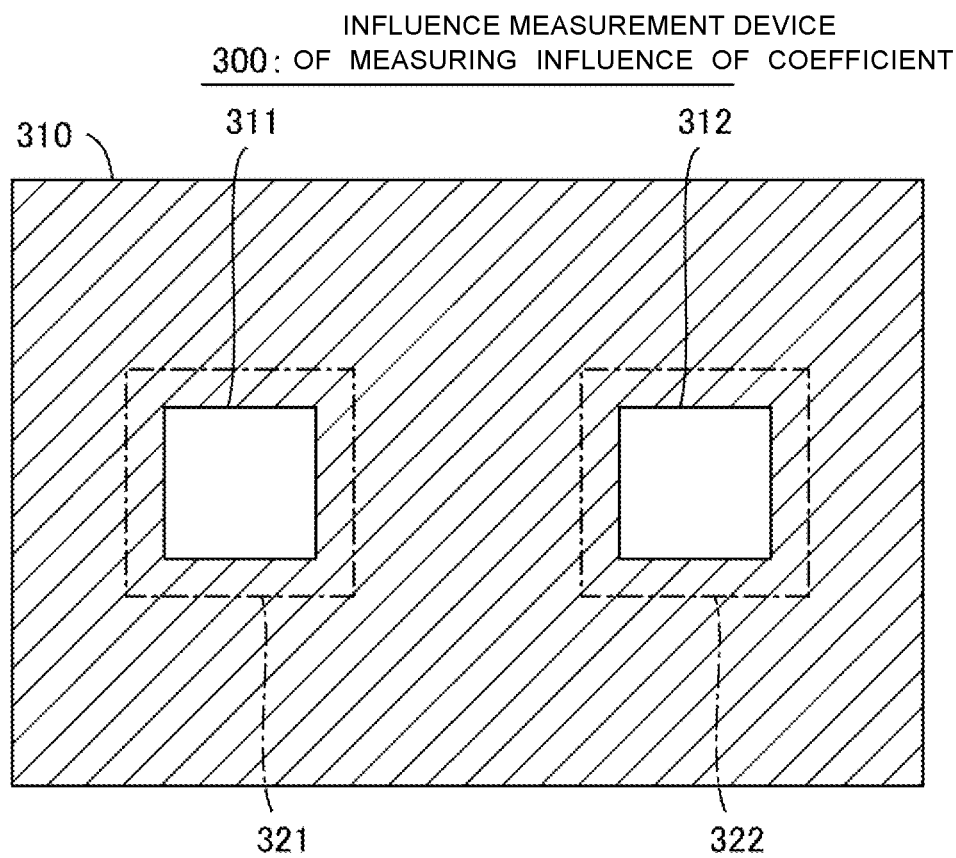
[Fig.10]
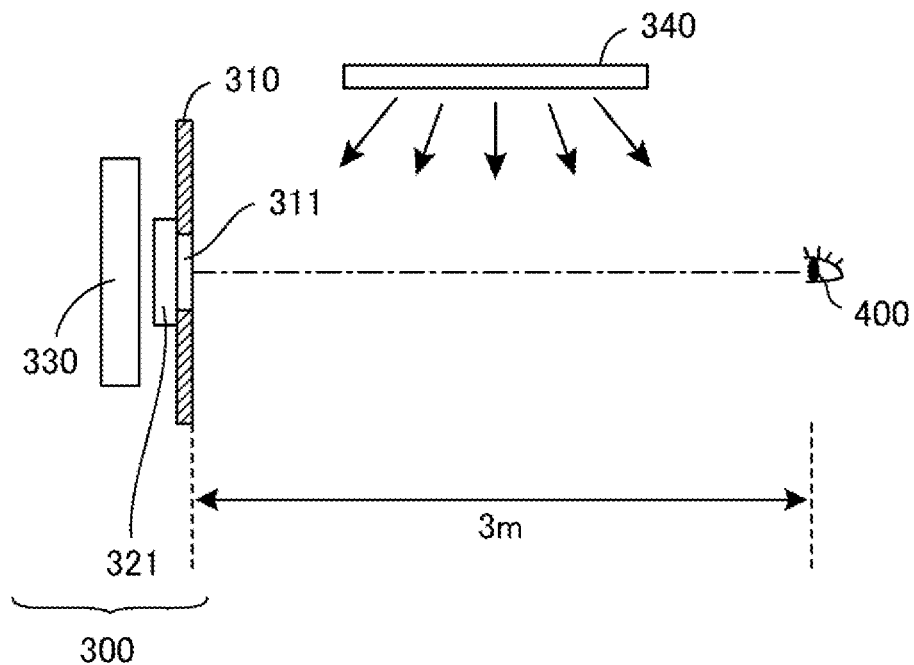

[Fig.11]
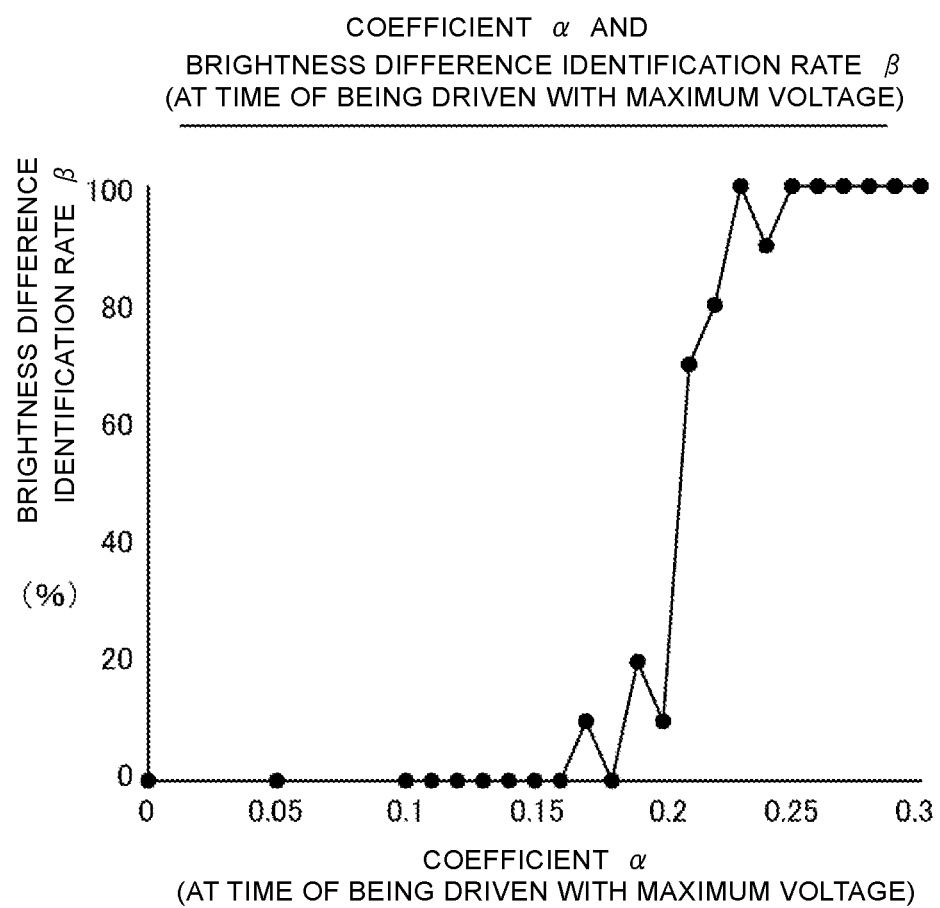

[Fig.12]
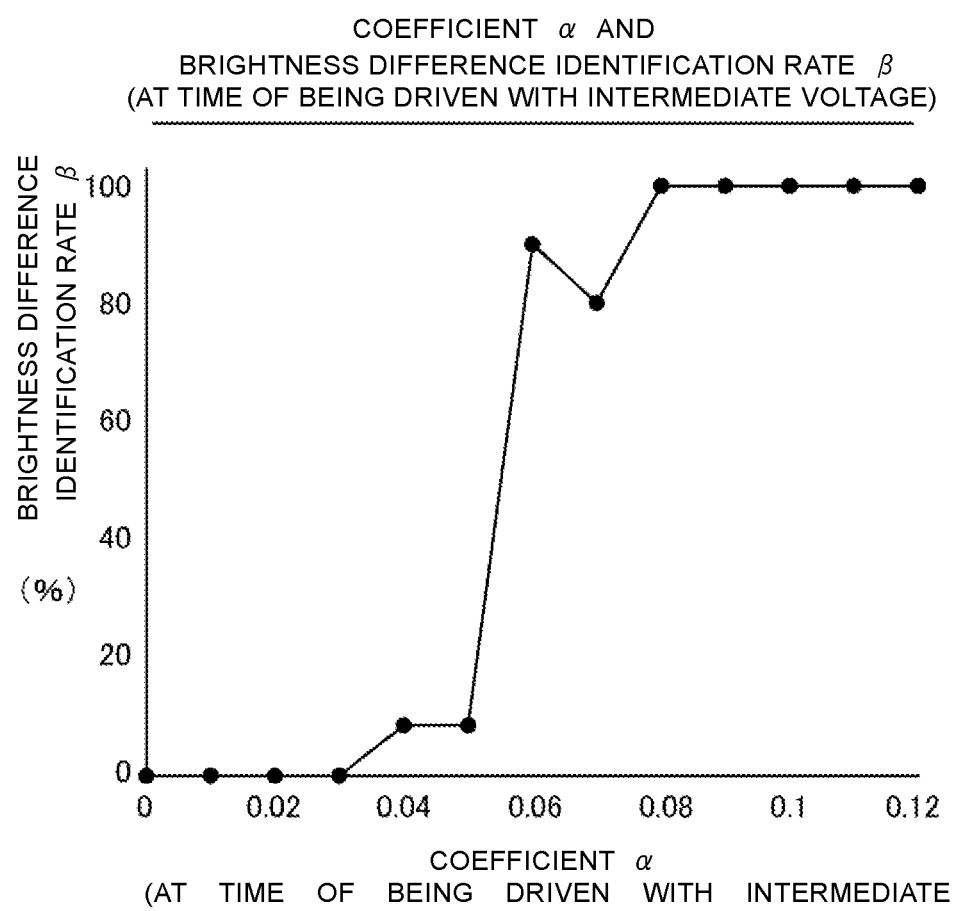

[Fig.13]
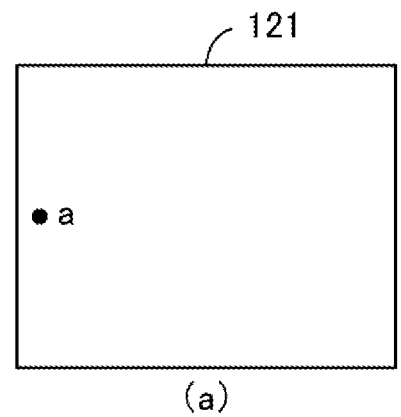
(a)
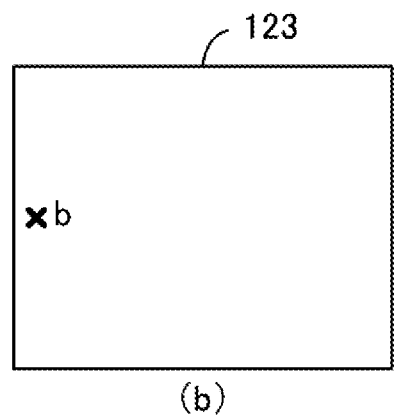
(b)

[Fig.14]
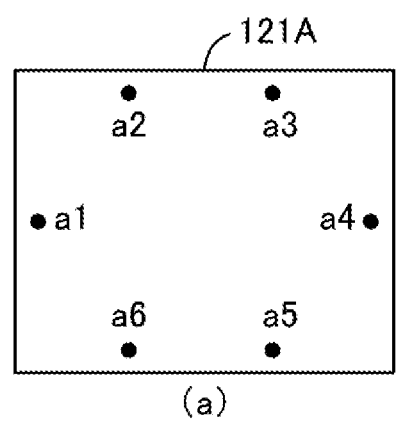
(a)
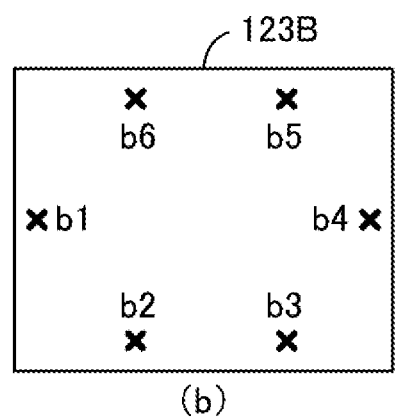
(b)

[Fig.15]
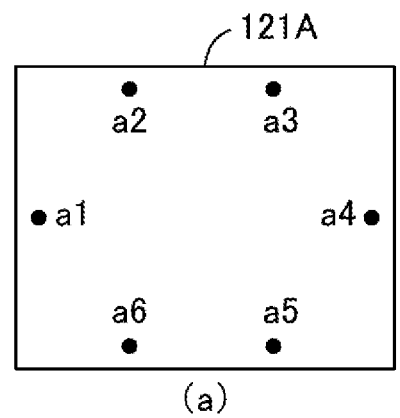
(a)
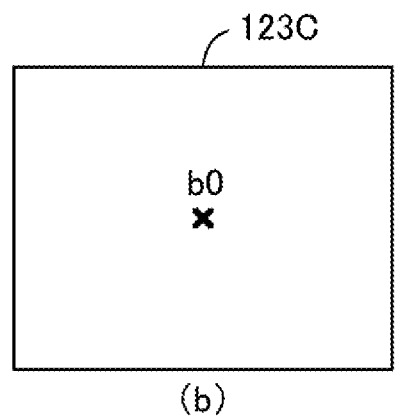
(b)

[Fig.16]
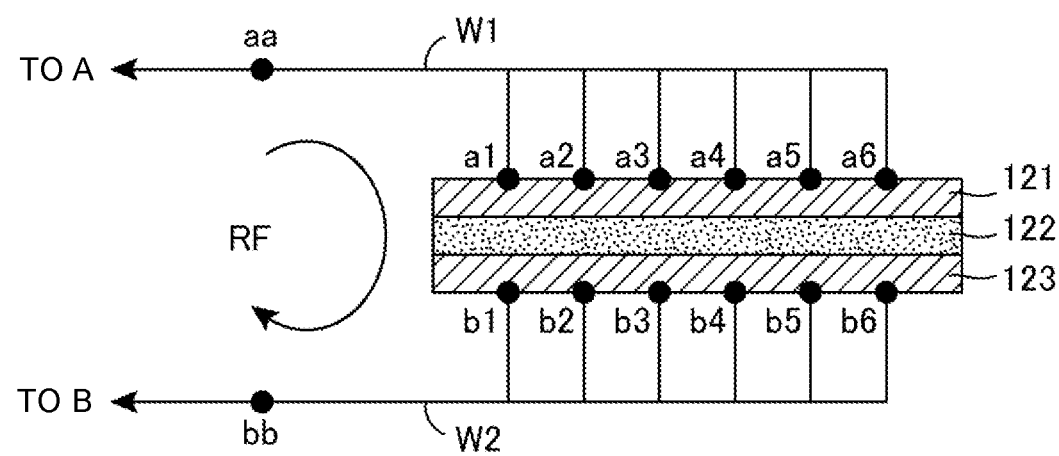

LIQUID CRYSTAL LIGHT CONTROL APPARATUS AND METHOD FOR MANUFACTURING SAME

TECHNICAL FIELD

The present invention relates to a liquid crystal light control apparatus and a method for manufacturing the same, and in particular, relates to a liquid crystal light control apparatus that includes a liquid crystal light control film used by being adhered to a transparent member having a large area such as a window of a building or an automobile and a power supply device for driving the liquid crystal light control film, and a method for designing the liquid crystal light control apparatus.

BACKGROUND ART

Liquid crystal has a property that its optical characteristics can be electrically controlled, and is used in various technical fields including a display device. A liquid crystal light control cell is one of such products, and a light transmission state can be changed by electrically controlling the transmittance of the liquid crystal. Recently, a product called a liquid crystal light control film, in which the area of the liquid crystal light control cell is increased and the resultant liquid crystal light control cell is processed into a film, has also been proposed, and is put into practical use as an electronic shade that can be gradually switched from a transparent state to a light shielding state.

For example, Patent Literature 1 discloses a liquid crystal light control film in which a resistance member having a variable resistance value is provided between electrode layers on both surfaces of a liquid crystal layer so as to change a transmittance depending on a position, thus expressing gradations. Patent Literature 2 discloses a liquid crystal light control film that has a spacer maintaining the thickness of a liquid crystal layer in order to avoid a decrease in transmittance, and Patent Literature 3 discloses a technique of permeating a part of a sealing material on an alignment film sandwiching a liquid crystal layer, thus firmly adhering the sealing material.

CITATION LIST

Patent Literature

Patent Literature 1: JP 6128269 B
Patent Literature 2: JP 2017-097339 A
Patent Literature 3: JP 6120196 B

SUMMARY OF INVENTION

Technical Problem

In order to drive a liquid crystal light control film, it is necessary to supply power from a power supply device. Consequently, it is necessary to provide a liquid crystal light control apparatus in which a liquid crystal light control film and a power supply device for driving the liquid crystal light control film are combined as an industrial product. In general, since a compact liquid crystal light control cell has a large DC resistance and a small electric capacitance, the compact liquid crystal light control cell can be driven with a relatively small current. Moreover, in the liquid crystal light control cell, since paired transparent electrodes are disposed with a distance of about several μm with a liquid crystal layer sandwiched therebetween, it is necessary to take protective measures for the power supply device in consideration of a short circuit accident. For this reason, the output impedance |Z0| of the power supply device used for the compact liquid crystal light control cell is generally set to high, and is usually |Z0|=several tens kΩ to hundreds kΩ.

However, as the cell area increases, the DC resistance of the liquid crystal light control cell decreases in inverse proportion to this, and the electric capacitance increases in proportion to the cell area. Consequently, in the case of a liquid crystal light control film having a film-like structure obtained by increasing the area of the liquid crystal light control cell, the DC resistance is smaller and the electric capacitance is larger than those of the compact liquid crystal light control cell. As a result, if a power supply device for a general compact liquid crystal light control cell is used directly as a power supply for driving a liquid crystal light control film, sufficient power is not supplied to the liquid crystal layer, even when a normal voltage is applied to the film.

In particular, in the case of a liquid crystal light control film used by being adhered to a transparent member having a relatively large area such as a window used for the exterior or interior of a building, a window for a vehicle, or glass for a showcase, when the liquid crystal light control film is driven by the power supply device for the conventional general compact liquid crystal light control cell, the transmittance cannot be sufficiently controlled. Consequently, in order to drive a large liquid crystal light control film without any trouble, measures have been taken to increase the voltage of the power supply device and to provide terminals for applying a voltage to the liquid crystal light control film at a large number of locations. However, if such measures are taken, the problem that the manufacturing cost increases will occur.

Consequently, an object of the present invention is to provide a liquid crystal light control apparatus capable of sufficiently controlling the transmittance of a liquid crystal light control film by a power supply device while preventing an increase in manufacturing cost, and to provide a method for manufacturing such a liquid crystal light control apparatus.

Solution to Problem (1) According to a first aspect of the present invention, there is provided a liquid crystal light control apparatus that executes light control by changing a transmittance of liquid crystal,
the liquid crystal light control apparatus includes a liquid crystal light control film and a power supply device that drives the liquid crystal light control film,
the liquid crystal light control film includes a liquid crystal layer, a first transparent electrode layer disposed on one surface of the liquid crystal layer, a second transparent electrode layer disposed on another surface of the liquid crystal layer, a film-side first connection terminal provided at a predetermined position on the first transparent electrode layer, and a film-side second connection terminal provided at a predetermined position on the second transparent electrode layer,
the power supply device has a function of supplying a predetermined AC voltage between a power-supply-side first connection terminal connected to the film-side first connection terminal and a power-supply-side second connection terminal connected to the film-side second connection terminal, and a condition $|Z0| \leq \alpha \times RF$ is satisfied where RF is a DC resistance between the film-side first connection terminal and the film-side second connection terminal of the liquid crystal light control film, $|Z0|$ is an output impedance between the power-supply-side first connection terminal and the power-supply-side second connection terminal of the power supply device, and a value of a predetermined coefficient α is 0.2.

(2) According to a second aspect of the present invention, in the liquid crystal light control apparatus of the first aspect described above,
a condition $|Z0| \leq \alpha \times RF$ is satisfied when a value of a coefficient α is 0.05.

(3) According to a third aspect of the present invention, in the liquid crystal light control apparatus of the first or second aspect described above,
the power supply device has a function of supplying an AC voltage having a peak voltage Vp with a maximum allowable current Imax, and further a condition $Vp/Imax \leq |Z0| \leq \alpha \times RF$ is satisfied.

(4) According to a fourth aspect of the present invention, in the liquid crystal light control apparatus of the third aspect described above,
the liquid crystal light control film has a minimum transmittance and a maximum transmittance, when the power supply device does not supply a voltage, the liquid crystal light control film has one of the minimum transmittance and the maximum transmittance, and when the power supply device supplies an AC voltage having a peak voltage Vp, the liquid crystal light control film has another of the minimum transmittance and the maximum transmittance.

(5) According to a fifth aspect of the present invention, in the liquid crystal light control apparatus of the first to fourth aspects described above,
the film-side first connection terminal is provided at a predetermined position on an edge of a liquid crystal light control film, and the film-side second connection terminal is provided at a position opposing the predetermined position on the liquid crystal light control film.

(6) According to a sixth aspect of the present invention, in the liquid crystal light control apparatus of the first to fourth aspects described above,
at least one of the film-side first connection terminal and the film-side second connection terminal is provided at a plurality of positions on the liquid crystal light control film.

(7) According to a seventh aspect of the present invention, in the liquid crystal light control apparatus of the first to sixth aspects described above,
the liquid crystal light control film has an area suitable for being used by being adhered to a window used for exterior or interior of a building, a window of a vehicle, or glass for a showcase.

(8) According to an eighth aspect of the present invention, in the liquid crystal light control apparatus of the first to sixth aspects described above,
the liquid crystal light control film has an area more than or equal to 0.1 m².

(9) According to a ninth aspect of the present invention, in the liquid crystal light control apparatus of the first to eighth aspects described above,
the liquid crystal layer is composed of a layer containing field-effect liquid crystal molecules, and the first transparent electrode layer and the second transparent electrode layer are composed of a layer made of ITO.

(10) According to a tenth aspect of the present invention, there is provided a method for manufacturing a liquid crystal light control apparatus that executes light control by changing a transmittance of liquid crystal,
the method includes
a light control film manufacturing step of manufacturing a liquid crystal light control film that includes a liquid crystal layer, a first transparent electrode layer disposed on one surface of the liquid crystal layer, a second transparent electrode layer disposed on another surface of the liquid crystal layer, a film-side first connection terminal provided at a predetermined position on the first transparent electrode layer, and a film-side second connection terminal provided at a predetermined position on the second transparent electrode layer,
a DC resistance measuring step of measuring a DC resistance RF between the film-side first connection terminal and the film-side second connection terminal, and
a power supply device manufacturing step of manufacturing a power supply device that has a function of supplying a predetermined AC voltage between a power-supply-side first connection terminal connected to the film-side first connection terminal and a power-supply-side second connection terminal connected to the film-side second connection terminal, and
at the power supply device manufacturing step, it is designed that an output impedance $|Z0|$ between the power-supply-side first connection terminal and the power-supply-side second connection terminal of the power supply device satisfies a condition $|Z0| \leq \alpha \times RF$ when a value of a predetermined coefficient α is 0.2.

(11) According to an eleventh aspect of the present invention, in the method for manufacturing a liquid crystal light control apparatus of the tenth aspect described above,
at the power supply device manufacturing step, it is designed that a condition $|Z0| \leq \alpha \times RF$ is satisfied when a value of a coefficient α is 0.05.

(12) According to a twelfth aspect of the present invention, in the method for manufacturing a liquid crystal light control apparatus of the tenth or eleventh aspect described above,
at the power supply device manufacturing step, it is designed to have a function of supplying an AC voltage having a peak voltage Vp with a maximum allowable current Imax, and further to satisfy a condition $Vp/Imax \leq |Z0| \leq \alpha \times RF$.

Advantageous Effects of Invention

The liquid crystal light control apparatus according to the present invention includes the liquid crystal light control film and the power supply device that drives the liquid crystal light control film, and it is designed to satisfy the condition $|Z0| \leq \alpha \times RF$ where RF is the DC resistance of the liquid crystal light control film, $|Z0|$ is the output impedance of the power supply device, and the value of the predetermined coefficient α is 0.2. Consequently, it is possible to execute sufficient transmittance control on the liquid crystal light control film without increasing the voltage of the power supply device or providing a large number of terminals for voltage application. As a result, it is possible to provide the liquid crystal light control apparatus capable of sufficiently controlling the transmittance of the liquid crystal light control film by the power supply device while preventing an increase in manufacturing cost.

Further, by adopting the embodiment in which it is designed to satisfy the condition $|Z0| \leq \alpha \times RF$ when the value of the coefficient α is 0.05, it is also possible to sufficiently control an intermediate transmittance.

Moreover, by adopting the embodiment in which it is designed that the power supply device has the function of supplying the AC voltage having the peak voltage Vp with the maximum allowable current Imax, and further, the condition $Vp/Imax \leq |Z0| \leq \alpha \times RF$ is satisfied, it is possible to execute sufficient transmittance control on the liquid crystal light control film while taking sufficient protection measures for the power supply device.

BRIEF DESCRIPTION OF DRAWINGS

FIG. 1 is a block diagram and a perspective view illustrating a basic configuration of a general liquid crystal light control apparatus 100 including the present invention.

FIG. 2(a) is a side sectional view of a liquid crystal light control film 120 illustrated in FIG. 1, and FIG. 2(b) is a circuit diagram illustrating an equivalent circuit of the liquid crystal light control film 120.

FIG. 3 is a graph illustrating AC drive characteristics of a 10 mm-square liquid crystal light control film.

FIG. 4 is a graph illustrating AC drive characteristics of a 1 m-square liquid crystal light control film.

FIG. 5 is a diagram illustrating a method for measuring an output impedance |Z0| of a power supply device 110.

FIG. 6 is a waveform diagram illustrating a difference in voltage waveform due to a difference in output impedance |Z0| of the power supply device 110.

FIG. 7 is a graph illustrating "transmittance-voltage characteristics" of the liquid crystal light control film 120 illustrated in FIG. 1.

FIG. 8 is a diagram illustrating design conditional expressions for the output impedance |Z0| of the power supply device 110, which is a feature of the present invention.

FIG. 9 is a front view of a device of measuring the influence of a coefficient α on transmittance control.

FIG. 10 is a side view (a part of which is side sectional view) illustrating a specific measurement method using the influence measurement device illustrated in FIG. 9.

FIG. 11 is a graph illustrating a relationship between the coefficient α and a brightness difference identification rate β at the time of being driven with a maximum voltage.

FIG. 12 is a graph illustrating a relationship between the coefficient α and the brightness difference identification rate β at the time of being driven with an intermediate voltage.

FIG. 13 is a plan view illustrating a basic example of the arrangement of film-side connection terminals in a liquid crystal light control apparatus according to the present invention.

FIG. 14 is a plan view illustrating a modification of the arrangement of the film-side connection terminals in the liquid crystal light control apparatus according to the present invention.

FIG. 15 is a plan view illustrating another modification of the arrangement of the film-side connection terminals in the liquid crystal light control apparatus according to the present invention.

FIG. 16 is a diagram illustrating a DC resistance RF of the liquid crystal light control film 120 in the modification illustrated in FIG. 14.

DESCRIPTION OF EMBODIMENTS

Hereinafter, the present invention will be described based on embodiments illustrated.

<<<§ 1. Basic Configuration of General Liquid Crystal Light Control Apparatus>>>

First, the basic configuration of a general liquid crystal light control apparatus will be briefly described in this § 1. The liquid crystal light control apparatus according to the present invention also has the basic configuration described here. FIG. 1 is a block diagram and a perspective view illustrating a basic configuration of a general liquid crystal light control apparatus 100 including the present invention. The liquid crystal light control apparatus 100 has a function of changing the transmittance of liquid crystal for light control, and as illustrated in FIG. 1, includes a power supply device 110 (illustrated in block diagram) and a liquid crystal light control film 120 (illustrated in perspective view).

The liquid crystal light control film 120 has a first transparent electrode layer 121, a liquid crystal layer 122, and a second transparent electrode layer 123 from top to bottom. The first transparent electrode layer 121 is disposed on one surface (upper surface in FIG. 1) of the liquid crystal layer 122, and the second transparent electrode layer 123 is disposed on the other surface (lower surface in FIG. 1) of the liquid crystal layer 122. Further, a film-side first connection terminal a is provided at a predetermined position on the first transparent electrode layer 121 (in FIG. 1, left edge of upper surface), and a film-side second connection terminal b is provided at a predetermined position on the second transparent electrode layer 123 (in FIG. 1, left edge of lower surface).

The liquid crystal layer 122 is composed of, for example, a layer containing field-effect liquid crystal molecules, whereas the first transparent electrode layer 121 and the second transparent electrode layer 123 are composed of, for example, a layer made of ITO (indium tin oxide). In practice, in addition to these three layers, a transparent film layer and a filter layer functioning as protective layers and the like may be used, but the description of these additional layers is omitted in the present application.

Meanwhile, the power supply device 110 is a constituent element for driving the liquid crystal light control film 120, and has a function of supplying a predetermined AC voltage between a power-supply-side first connection terminal A connected to the film-side first connection terminal a and a power-supply-side second connection terminal B connected to the film-side second connection terminal b. In FIG. 1, the conceptual internal configuration of the power supply device 110 is illustrated as a combination of an ideal power supply 111 and an output impedance 112. The ideal power supply 111 is a theoretical signal source that generates an ideal AC signal (rectangular wave or sine wave), and the output impedance 112 is a resistance element inside the circuit that constitutes the power supply device 110. The output impedance 112 is the sum of the original impedance of the power supply itself and the impedance that is intentionally added to protect the power supply and the connection circuit from damage, heat generation, and ignition due to overcurrent. In the present application, the value of the output impedance 112 of the power supply device 110 is indicated by the symbol |Z0|.

As described above, an AC signal is supplied between the connection terminals a and b on a side of the liquid crystal light control film 120 from the power supply device 110, and an AC voltage is applied to the liquid crystal layer 122 sandwiched between the first transparent electrode layer 121 and the second transparent electrode layer 123 in a thickness direction of the liquid crystal layer 122. The liquid crystal layer 122 contains liquid crystal molecules whose orientation is changed by an electric field, and its translucency is changed by application of a voltage. The term "liquid crystal light control film" in the present application is basically synonymous with "liquid crystal light control cell", but refers to the one that has a sheet shape in which the area of each constituent layer is a relatively large, and that is used by being adhered, as a film, to a transparent member having a large area, such as a window for a building or an automobile.

The liquid crystal light control film 120 is classified into two types of products, that is, a normally dark product and a normally clear product, depending on the type of liquid crystal molecules constituting the liquid crystal layer 122. In the normally dark product, when no voltage is applied, the liquid crystal layer 122 has a low light transmittance, and thus this product is observed as an "opaque" film by an observer. However, when a voltage is applied, the liquid crystal layer 122 has a high light transmittance and thus this product is observed as a "transparent" film by the observer. On the other hand, in the normally clear product, when no voltage is applied, the liquid crystal layer 122 has a high light transmittance, and thus this product is observed as a "transparent" film by the observer. However, when a voltage is applied, the liquid crystal layer 122 has a low light transmittance, and thus this product is observed as an "opaque" film by the observer. The present invention is applicable to both types of products.

FIG. 2(a) is a side sectional view of the liquid crystal light control film 120 illustrated in FIG. 1. As described above, the liquid crystal layer 122 is a layer sandwiched between the first transparent electrode layer 121 and the second transparent electrode layer 123, and usually has a thickness of about several μm. As described above, an AC voltage generated by the power supply device 110 is applied between the film-side first connection terminal a and the film-side second connection terminal b. The first transparent electrode layer 121 and the second transparent electrode layer 123 are made of, for example, a transparent and conductive material such as ITO (indium tin oxide), and an AC voltage is applied to the entire liquid crystal layer 122. Consequently, when the liquid crystal layer 122 is transparent, the entire liquid crystal light control film 120 is also transparent, and when the liquid crystal layer 122 is opaque, the entire liquid crystal light control film 120 is also opaque.

As illustrated on the right side of FIG. 2(a), a film-side first distant point c and a film-side second distant point d are defined. These distant points c and d are points defined for convenience of explanation, and no physical structure is present. The film-side first distant point c is a point defined on the upper surface of the first transparent electrode layer 121, and the film-side second distant point d is a point defined on the lower surface of the second transparent electrode layer 123.

An electric signal from the power supply device 110 is directly supplied to the film-side first connection terminal a and the film-side second connection terminal b, but an electric signal from the power supply device 110 is indirectly supplied to the film-side first distant point c and the film-side second distant point d via the first transparent electrode layer 121 and the second transparent electrode layer 123, respectively. Since the first transparent electrode layer 121 and the second transparent electrode layer 123 have some electric resistances, the voltage applied across the distant points c and d is slightly lower than the voltage applied across the connection terminals a and b.

FIG. 2(b) is a circuit diagram illustrating an equivalent circuit of the liquid crystal light control film 120 illustrated in FIG. 2(a). In FIG. 2(b), the line from the point a to the point c corresponds to the first transparent electrode layer 121, and a first electrode layer resistance R1 is a resistance between the points a and c on this first transparent electrode layer 121. Similarly, the line from the point b to the point d corresponds to the second transparent electrode layer 123, and a second electrode layer resistance R2 is a resistance between the points b and d on this second transparent electrode layer 123. If the resistances of wires between the power supply device 110 and the respective connection terminals a and b are also reflected, these wiring resistances may be included in the resistances R1 and R2, respectively. Meanwhile, RL and CL connected in parallel in FIG. 2(b) respectively indicate the resistance of the liquid crystal layer 122 (when alignment film is present, resistance of alignment film is also included) and the electric capacitance of the liquid crystal layer 122 (when alignment film is present, electric capacitance of alignment film is also included).

In a case where a voltage Vin is supplied between the connection terminals a and b, for example, when the side of the connection terminal a is positive, a current flows in a path along an arrow in FIG. 2(b). RF is a DC resistance between the connection terminals a and b along such a path, and is referred to as "DC resistance of liquid crystal light control film" in the present application. The value of this RF is represented as $$RF=R1+R2+RL$$

as described in the lower part of FIG. 2(b).

As described above, since the first transparent electrode layer 121 has the resistance R1 and the second transparent electrode layer 123 has the resistance R2, a voltage Vend applied across the distant points c and d is slightly lower than the voltage Vin applied across the connection terminals a and b. In the case of a compact liquid crystal light control cell, this voltage drop is small, and thus there is no major problem in operation. However, in the case of a liquid crystal light control film with a large area, this voltage drop is a factor that causes a significant difference in light transmittance.

As the area of the liquid crystal light control film 120 increases, the distance between the two points a and c and the distance between the two points b and d increase. Consequently, the values of the first electrode layer resistance R1 and the second electrode layer resistance R2 are increased, but the liquid crystal layer resistance RL is reduced. Since the values of the resistances R1 and R2 are smaller than the value of the resistance RL, the value of the DC resistance RF of the liquid crystal light control film is largely controlled by the value of the resistance RL. As the area of the liquid crystal light control film 120 increases, the value of the resistance RF decreases. Further, the resistance RL and the capacitance CL are connected in parallel, and thus when the area of the liquid crystal light control film 120 increases and the value of the resistance RL decreases, more current flows through the resistance RL and the charge supplied to the capacitance CL decreases, so that the original power supplied to the capacitance CL for driving the liquid crystal decreases. Therefore, as the area of the liquid crystal light control film 120 increases, more power needs to be supplied from the power supply device 110.

<<<§ 2. AC Drive Characteristics of Liquid Crystal Light Control Film>>>

DC drive can be performed on the liquid crystal light control film 120, and the light transmittance of the liquid crystal layer 122 can be controlled by applying a DC voltage across the connection terminals a and b illustrated in FIG. 2. However, when the DC drive is performed, the orientation of liquid crystal molecules is fixed in a state of being always biased in the same direction, and thus so-called "liquid crystal burn-in" occurs. Even if the voltage supply is stopped, the liquid crystal light control film 120 cannot return to its original state. Consequently, in general, AC drive (generally, drive by AC signal having frequency of 30 to 200 Hz) is usually performed. The liquid crystal light control apparatus 100 according to the present invention is also a device on the assumption that the liquid crystal light control film 120 is subject to AC drive, and the power supply device 110 has a function of supplying AC power.

The AC drive characteristics of the liquid crystal light control film 120 described in § 1 will be described below. FIG. 3 is a graph illustrating the AC drive characteristics of a 10 mm-square liquid crystal light control film 120. In this liquid crystal light control film 120, the distance between the two points a and c illustrated in FIG. 2(a) is at most about 10 mm, and thus the liquid crystal light control film 120 is "liquid crystal light control cell" rather than "liquid crystal light control film". However, the liquid crystal light control film 120 is referred to as "liquid crystal light control film" for convenience of comparison.

FIG. 3(a) is a graph illustrating the results of measuring the connection terminal supply voltage Vin (voltage between two points a and b in FIG. 2(a): solid line graph) and the distant terminal supply voltage Vend (voltage between two points c and d in FIG. 2(a): broken line graph) with an oscilloscope in a case of using the power supply device 110 that generates a 60-Hz rectangular wave used in a conventional general liquid crystal light control cell. Although only the solid line graph Vin appears in the figure, the broken line graph Vend overlaps the solid line graph Vin. FIG. 3(b) is a similar graph in a case of using the power supply device 110 that generates a 60-Hz sine wave, and the broken line graph Vend also overlaps a solid line graph Vin. As a result, in both of the cases of using the rectangular wave and using the sine wave, the waveform of the AC voltage Vin and the waveform of the AC voltage Vend completely match, and a uniform voltage is applied to the respective portions of the liquid crystal light control film 120 illustrated in FIG. 2(a) in the thickness direction.

As described above, the graphs illustrated in FIG. 3 are graphs when the 10 mm-square liquid crystal light control film 120 (liquid crystal light control cell) is driven by a power supply for the conventional general liquid crystal light control cell. It can be seen from these graphs that a substantially uniform voltage is applied to the entire surface of the liquid crystal light control film 120. That is, when the peak voltage generated by the power supply device 110 (instantaneous peak voltage of AC signal) is indicated by Vp, a peak voltage substantially equal to the peak voltage Vp is applied over the entire surface of the liquid crystal light control film 120. Consequently, it can be estimated that almost uniform light transmittance is obtained over the entire surface of the liquid crystal light control film 120. As a result, in the case of the liquid crystal light control film 120 (liquid crystal light control cell) having such a size, there is no trouble when the liquid crystal light control film 120 is driven by using the power supply device 110 for driving the conventional general liquid crystal light control cell.

On the other hand, FIG. 4 is a graph illustrating the AC drive characteristics of a 1 m-square liquid crystal light control film 120. The liquid crystal light control film 120 is a square film with a side of 1 m and is used by being adhered to a transparent member having a large area such as a window of a building or an automobile. For this reason, the distance between the two points a and c illustrated in FIG. 2(a) is about 1 m, and the values of the first electrode layer resistance R1 and the second electrode layer resistance R2 are not negligible. The value of the liquid crystal layer resistance RL inversely decreases, a large amount of power is consumed by the resistance RL, and thus the original power supplied to the capacitance CL for driving the liquid crystal decreases.

FIGS. 4(a) and 4(b) are graphs illustrating the connection terminal supply voltage Vin (solid line graph) and the distant terminal supply voltage Vend (broken line graph) in a case of using the power supply device 110 that is the same as the power supply device used when the graphs of FIGS. 3(a) and 3(b) are obtained (power supply device used for conventional general liquid crystal light control cell). The waveform of the supply voltage Vin indicated by the solid line graph is close to the original rectangular wave or sine wave generated by the ideal power supply 111, whereas the waveform of the supply voltage Vend indicated by the broken line graph has the original peak voltage Vp that decreases considerably and is rounded.

That is, the supply voltage Vend (broken line graph) across the two points c and d decreases as compared with the supply voltage Vin (solid line graph) across the two points a and b illustrated in FIG. 2(b), a difference in applied voltage between the respective portions of the liquid crystal light control film 120 appears, and thus the light transmittance becomes uneven. Of course, in some cases, the supply voltage across the two points a and b may be lower than the voltage that the power supply device 110 can originally supply, and thus the liquid crystal light control film 120 as a whole cannot perform the original light control function. That is, in the case of the normally dark product, even if an AC signal having the peak voltage Vp is supplied to this product for drive, the product is not in an original fully transparent state but in a cloudy state. Further, in the case of the normally clear product, even if an AC signal having the peak voltage Vp is supplied to this product for drive, the product is not in an original fully opaque state but in a semitransparent state.

As described above, the power supply device designed to drive a 10 mm-square liquid crystal light control film can drive normally the liquid crystal light control film, but cannot drive normally a 1 m-square liquid crystal light control film. The present invention is mainly directed to a liquid crystal light control apparatus having a liquid crystal light control film having an area suitable for being used by being adhered to a window used for exterior or interior of a building, a window of a vehicle, or glass for a showcase, and relates to an apparatus used as an electronic shade, for example. A power supply device used for such a liquid crystal light control apparatus needs to have a function suitable for driving the liquid crystal light control film having a large area.

According to an experiment conducted by the inventors of the present application, a general power supply device designed to drive an about 10 mm-square liquid crystal light control cell was unable to drive normally a large liquid crystal light control film having an area more than or equal to 0.1 m². The present invention has been made mainly for a liquid crystal light control apparatus having a large liquid crystal light control film having an area more than or equal to 0.1 m², and proposes optimum design conditions for a power supply device that can drive normally such a large liquid crystal light control film.

<<<§ 3. Features of Liquid Crystal Light Control Apparatus According to Present Invention>>>

As a method for supplying power sufficient for driving the large liquid crystal light control film 120 without any trouble, there is a method for increasing the voltage of the power supply device 110, but if the output voltage of the power supply device 110 increases, the cost also increases. Alternatively, there is a method for providing connection terminals for applying a voltage to the liquid crystal light control film 120 at a large number of positions, but this method also causes a problem of high cost. For example, in the case of the example illustrated in FIG. 1, the film-side connection terminals a and b are provided on the left edge of the liquid crystal light control film 120. If these connection terminals are provided at a large number of positions along the edge of the liquid crystal light control film 120, it is possible to prevent a partial voltage drop. However, since the number of electrical connection points with the power supply device 110 increases to a large number, the manufacturing cost inevitably increases.

In order to reduce the manufacturing cost, as in the example illustrated in FIG. 1, it is preferable to provide the film-side first connection terminal a at a predetermined position on the edge of the liquid crystal light control film 120 (left edge in example illustrated in FIG. 1), to provide the film-side second connection terminal b at a position opposing the predetermined position on the liquid crystal light control film 120, and to perform wiring from the power supply device 110 only at one position.

Consequently, in order to sufficiently control the transmittance of the liquid crystal light control film 120 by the power supply device 110 while the increase in manufacturing cost is prevented, the present inventors have focused on imposing predetermined conditions on an output impedance |Z0| of the power supply device 110. The output impedance |Z0| is known as one of the important parameters that influence a power supply capability. This output impedance |Z0| is a resistance element inside the circuit that constitutes the power supply device 110, as indicated by the block 112 in the block diagram of FIG. 1.

Generally, in order to secure sufficient power supply, it is preferable to set the output impedance |Z0| of the power supply device 110 as low as possible. This is because the lower the output impedance |Z0| is, the lower the power consumption inside the power supply device 110 is, and thus more power can be supplied accordingly. However, the output impedance |Z0| of a power supply device used for a compact liquid crystal light control cell is set to high, and is usually |Z0|=several tens kΩ to hundreds kΩ. This is based on the unique circumstances. That is, in the case of the liquid crystal light control apparatus 100, since the liquid crystal layer 122 has a thickness of only about several μm, it is necessary to take measures to protect the power supply device 110 if a short circuit accident occurs in the liquid crystal layer 122. As described above, in driving the large liquid crystal light control film 120, setting conditions of the output impedance |Z0| of the power supply device 110 are important.

FIG. 5 is a diagram illustrating a method for measuring the output impedance |Z0| of the power supply device 110. First, as illustrated in FIG. 5(*a*), a voltmeter 200 is connected to the power supply device 110 to measure a voltage V (no-load power supply voltage) across the connection terminals (output terminals) A and B. Next, as illustrated in FIG. 5(*b*), a load resistance R with a resistance value R is connected between the connection terminals A and B, and a voltage Vr (load power supply voltage) across the connection terminals A and B is measured in such a state. In this case, as illustrated in FIG. 5(*c*), the following relational expression is satisfied, $$Vr/V = R/(|Z0|+R).$$

The value of the output impedance |Z0| of the power supply device 110 can thus be calculated based on the resistance value R and the measured voltage values V and Vr.

FIG. 6 is a waveform diagram illustrating a difference in voltage waveform due to a difference in output impedance |Z0| of the power supply device 110. The waveform illustrated in column (a) is a waveform obtained by measuring the no-load power supply voltage V illustrated in FIG. 5(*a*) in the power supply device 110 having the output impedance |Z0|=1 kΩ, and the waveform illustrated in column (b) is a waveform obtained by measuring the load power supply voltage Vr illustrated in FIG. 5(*b*) in the same power supply device 110 having |Z0|=1 kΩ. As illustrated in FIG. 6, the load power supply voltage Vr is significantly lower than the no-load power supply voltage V.

On the other hand, the waveform illustrated in column (c) is a waveform obtained by measuring the no-load power supply voltage V illustrated in FIG. 5(*a*) in the power supply device 110 having the output impedance |Z0|=50Ω, and the waveform illustrated in column (d) is a waveform obtained by measuring the load power supply voltage Vr illustrated in FIG. 5(*b*) in the same power supply device 110 having |Z0|=50Ω. As illustrated in FIG. 6, the no-load power supply voltage V is almost equal to the load power supply voltage V, and no voltage drop due to load connection is observed.

This indicates that the smaller the value of the output impedance |Z0| is, the smaller the voltage drop due to the load connection is. From the viewpoint of sufficiently supplying power to the liquid crystal light control film 120, it is preferable to use not the power supply device 110 having the output impedance |Z0|=1 kΩ but the power supply device 110 having the output impedance |Z0|=50Ω. However, as described above, in the case of the liquid crystal light control film 120, the liquid crystal layer 122 has a thickness of only about several μm, and from the viewpoint of safety measures for protecting the power supply device 110, it is preferable to use the power supply device 110 having the output impedance |Z0|=1 kΩ. Further, generally, in order to design a power supply device having a small output impedance |Z0|, it is necessary to use expensive electronic parts, which results in a high cost. Consequently, it is preferable that the output impedance |Z0| is as large as possible also from the viewpoint of preventing an increase in manufacturing cost.

As a result, the value of the output impedance |Z0| of the power supply device 110 in the liquid crystal light control apparatus 100 needs to be set to a small value in order for the liquid crystal light control film 120 to perform a sufficient light control function, and the value needs to be set to a large value in order to take sufficiently safety measures for the power supply device 110. Moreover, in order to reduce the manufacturing cost, the output impedance is preferably to set to a large value. In view of these points, the present inventors have succeeded in finding the optimum conditions for the output impedance |Z0| of the power supply device 110 by conducting an experiment in which a human is a subject.

FIG. 7 is a graph illustrating "transmittance-voltage characteristics" of the liquid crystal light control film 120 illustrated in FIG. 1, and indicates a peak voltage (unit V: hereinafter, simply referred to as "applied voltage") of a rectangular wave AC signal applied between the connection terminals a and b and the light transmittance (unit %: average value over entire surface) of the liquid crystal light control film 120 at peak voltage. The liquid crystal light control film 120 used as a measurement target uses the liquid crystal layer 122 of a normally dark type. When the applied voltage is 0 V, the liquid crystal light control film 120 maintains a perfect light shielding state with a transmittance of 0%. When the applied voltage exceeds about 3 V, the transmittance gradually rises, and when the applied voltage is 10 V, the transmittance is about 33%, and the liquid crystal light control film 120 is in a semitransparent state like frosted glass.

As described above, the example illustrated in FIG. 7 is an example of the liquid crystal light control apparatus 100 having a function of executing light control to control the transmittance in the range of 0% to 33%. By adjusting the applied voltage in the range of 0 to 10 V, the transmittance can be controlled in the range of 0% to 33%. However, in these characteristics, there is a characteristic that the transmittance changes suddenly when the applied voltage is around 4 to 5 V, and the transmittance hardly changes in a section where the applied voltage is 0 to 3 V and in a section where the applied voltage is 6 to 10 V. That is, the graph has a characteristic that the transmittance changes suddenly in a region where the applied voltage has an intermediate value, and the transmittance changes slowly in a portion where the applied voltage is low and a portion where the applied voltage is high. Consequently, even in a case where although the applied voltage is originally 10 V, for example, only 6V is actually applied at some positions because of the voltage drop due to the cause described above, the decrease in transmittance is very small at these positions, and no problem will occur if the transmittance decreases to the extent that an observer cannot recognize the decrease.

FIG. 7 is a graph for a normally dark liquid crystal layer. Meanwhile, the graph for a normally clear liquid crystal layer has a shape in which the magnitude of the transmittance is reversed, and as the applied voltage increases, the transmittance gradually decreases. The graph also has a characteristic that the transmittance changes suddenly in a region where the applied voltage has an intermediate value, and the transmittance changes slowly in a portion where the applied voltage is low and a portion where the applied voltage is high.

In view of the fact that the graph of the transmittance-voltage characteristics of the liquid crystal layer have such a shape, when a predetermined voltage is supplied from the power supply device 110 to the liquid crystal light control film 120 to obtain a predetermined transmittance, even if the voltage to be originally supplied is partially or entirely reduced and this causes a region having a transmittance slightly different from the original transmittance, no practical problem occurs if such a change in transmittance cannot be recognized by an observer.

As described above, the value of the output impedance $|Z0|$ of the power supply device 110 is preferably set to a value as small as possible in order not to cause a drop in the supply voltage, but is preferably set to a large value in order to take safety measures for the power supply device 110. In other words, if the value of $|Z0|$ is increased as a safety measure, a portion where the supply voltage decreases is generated, and thus an abnormal region where the original transmittance cannot be obtained is generated. However, if the generation of the abnormal region is not recognized by an observer, no practical problem occurs. In view of such a point, the present inventors have succeeded in finding the upper limit value of the output impedance $|Z0|$ of the power supply device 110 by conducting an experiment in which a human is a subject. The experiment is described in detail in § 4.

However, the specific upper limit value of the output impedance $|Z0|$ of the power supply device 110 varies depending on the liquid crystal light control film 120 to which power is supplied. For example, when the upper limit value of the output impedance $|Z0|$ in the power supply device 110 (50 cm) that supplies power to a 50 cm-square liquid crystal light control film 120 (50 cm) is compared with the upper limit value of the output impedance $|Z0|$ in the power supply device 110 (1 m) that supplies power to a 1 m-square liquid crystal light control film 120 (1 m), the upper limit value of the power supply device 110 (1 m) should be less than the upper limit value of the power supply device 110 (50 cm).

This is because the liquid crystal light control film 120 (1 m) has a larger area than the liquid crystal light control film 120 (50 cm) and has a smaller DC resistance RF, and thus the output impedance $|Z0|$ of the power supply device is reduced accordingly to keep the balance, so that sufficient power supply capability is secured. In other words, as the DC resistance RF of the liquid crystal light control film 120 is reduced, the output impedance $|Z0|$ of the power supply device 110 side has to be reduced to keep the balance, and thus the upper limit value of the output impedance $|Z0|$ is also reduced.

The present inventors have conceived that the power supply device 110 that satisfies the following conditional expression is necessary in order to drive the liquid crystal light control film 120 with a sufficient light control function.

$$|Z0| \leq \alpha \times RF$$

This conditional expression indicates that the upper limit value of the output impedance $|Z0|$ of the power supply device 110 is $\alpha \times RF$. Here, $|Z0|$ is the output impedance of the power supply device 110, and in the case of the example illustrated in FIG. 1, is the impedance between the power-supply-side first connection terminal A and the power-supply-side second connection terminal B. RF is the DC resistance of the liquid crystal light control film 120, and in the example illustrated in FIG. 1, is a DC resistance between the film-side first connection terminal a and the film-side second connection terminal b. $\alpha$ is a predetermined proportional coefficient, and an ideal value has been measured by the experiment to be described in § 4. As a result, it has been found that it is appropriate to set $\alpha=0.2$, and more preferably $\alpha=0.05$ (details will be described later).

On the other hand, it is preferable to set the output impedance $|Z0|$ to a value as large as possible in view of taking sufficient safety measures for the power supply device 110, and it is preferable to set a predetermined lower limit value of the output impedance $|Z0|$ from the viewpoint of these safety measures. From such a viewpoint, it is preferable that the output impedance $|Z0|$ satisfies the following conditional expression.

$$Vp/I \max \leq |Z0|$$

This conditional expression indicates that the lower limit value of the output impedance $|Z0|$ of the power supply device 110 is $Vp/Imax$. Vp is the peak voltage of an AC signal output by the power supply device 110, and Imax is the maximum allowable current in the design of the power supply device 110.

Normally, in designing a power supply device, the value of the maximum allowable current Imax is set in advance, and components conforming to this maximum allowable current Imax are used as the components of a power supply circuit. Consequently, a value of the maximum allowable current Imax that is unique to each power supply device is set. Here, when the lower limit value of the output impedance |Z0| is set to Vp/Imax, even if a short circuit accident occurs in the liquid crystal light control film 120 side, the current value supplied from the power supply device 110 is less than or equal to the maximum allowable current Imax, and thus it is possible to prevent the power supply device 110 from being damaged.

However, if it does not matter that the power supply device 110 is damaged in the event of a short circuit accident in the liquid crystal light control film 120 side, it is not always necessary to set the lower limit value described above, and it may be designed so that the value of the output impedance |Z0| is less than Vp/Imax. Consequently, in carrying out the present invention, it is possible to perform an operation in which only the upper limit value is set. However, if a current that exceeds the maximum permissible current Imax flows in the power supply device 110 in the event of a short-circuit accident, some electronic components may catch fire, and thus in view of securing safety, it is preferable to design the value of the output impedance |Z0| by reflecting the lower limit value.

FIG. 8 is a diagram illustrating design conditional expressions for the output impedance |Z0| of the power supply device 110, which is a feature of the present invention. FIG. 8(a) illustrates the conditional expression "|Z0|≤α×RF" related to the upper limit value described above. Here, RF is the DC resistance of the liquid crystal light control film 120, and can be measured as an electric resistance between the connection terminals a and b in FIG. 2 using a tester or the like. Meanwhile, the proportional coefficient α may be set to α=0.2, more preferably α=0.05, as will be described in § 4. If only the conditional expression related to the upper limit value is reflected, it is only required to use the power supply device 110 that satisfies the condition that the output impedance |Z0| is "|Z0|≤α×RF".

On the other hand, FIG. 8(b) illustrates the conditional expression "Vp/Imax≤|Z0|" related to the lower limit value described above. Here, Imax is the maximum allowable current in the design of the power supply device 110, and is set in advance at the time of designing, as described above. Vp is the peak voltage of an AC signal output by the power supply device 110, and a predetermined voltage value is set as the peak voltage Vp in view of the characteristics of the liquid crystal light control film 120 to be supplied with power as illustrated in FIG. 7.

For example, when light control is executed to control the transmittance in the range of 0% to 33% from the viewpoint of the application, using the liquid crystal light control film 120 having normally dark characteristics illustrated in FIG. 7, the minimum transmittance is set to 0% and the maximum transmittance is set to 33%. In this case, when the power supply device 110 does not supply a voltage, the liquid crystal light control film 120 has a minimum transmittance of 0%, and when the power supply device 110 supplies an AC voltage having a peak voltage Vp=10 V, the liquid crystal light control film 120 has a maximum transmittance of 33%. Consequently, in this case, the peak voltage Vp may be set to 10 V. When the liquid crystal light control film 120 having normally clear characteristics is used, the magnitude relationship of a supply voltage and the relationship between the minimum transmittance and the maximum transmittance are reversed, but the peak voltage Vp can be set by the similar method.

In short, the minimum transmittance and the maximum transmittance of the liquid crystal light control film 120 are determined for the application of the liquid crystal light control film 120, and when the power supply device 110 does not supply a voltage, the liquid crystal light control film 120 has one of the minimum transmittance and the maximum transmittance, and when the power supply device 110 supplies an AC voltage having the peak voltage Vp, the liquid crystal light control film 120 has the other of the minimum transmittance and the maximum transmittance.

As described above, the conditional expression illustrated in FIG. 8(b) indicates that a power supply device that has a function of supplying an AC voltage having the peak voltage Vp with the maximum allowable current Imax is used. When the conditional expression related to the lower limit value illustrated in FIG. 8(b) is reflected in addition to the conditional expression related to the upper limit value illustrated in FIG. 8(a), it suffices to use the power supply device 110 that satisfies the condition that the output impedance |Z0| is "Vp/Imax≤|Z0|≤α×RF".

Here, the condition related to the upper limit value "|Z0|≤α×RF" is a condition indicating a limit necessary for the liquid crystal light control film 120 to perform a sufficient light control function, and if a power supply device having an output impedance |Z0| that exceeds the upper limit value is used, the liquid crystal light control film 120 has a change in transmittance that can be recognized by an observer, and the sufficient light control function cannot be achieved. On the other hand, the condition related to the lower limit value "Vp/Imax≤|Z0|" is a condition indicating a limit necessary for taking sufficient safety measures for the power supply device 100 in the event that a short circuit accident occurs in the liquid crystal layer 120, and if a power supply device having an output impedance |Z0| less than this lower limit value is used, at the time of a short circuit accident, an excess current exceeding the maximum allowable current Imax flows in the power supply device 100, thus causing damage to the power supply device 100 and igniting circuit components.

The liquid crystal light control apparatus 100 according to the present invention is configured by combining a specific liquid crystal light control film 120 with the power supply device 110 capable of satisfying at least the condition related to the upper limit value described above, and achieves operational effects in which the transmittance can be sufficiently controlled while an increase in manufacturing cost is prevented. Further, by combining the power supply device 110 capable of satisfying the condition related to the lower limit value in addition to the condition related to the upper limit value, operational effects in which sufficient protection measures for the power supply device can be taken and the manufacturing cost can be further reduced, can be added.

<<<§ 4. Experiment for Determining Coefficient α>>>

The results of an experiment conducted to determine the proportional coefficient α in the conditional expression "|Z0|≤α×RF" that defines the upper limit value of the output impedance |Z0| described in § 3 will be described. FIG. 9 is a front view of an influence measurement device 300 of measuring the influence of the coefficient α, the influence measurement device 300 being used in this experiment. In this influence measurement device 300, as illustrated in FIG. 9, a black drawing paper 310 that has a rectangular shape and an A4 size includes two rectangular openings 311 and 312, and liquid crystal light control apparatuses 321 and 322 are attached to the back side of these openings 311 and 312, respectively (outlines of apparatuses 321 and 322 are illustrated in FIG. 9 by one-dot chain lines). In practice, a backlight 330 is disposed behind each of the liquid crystal light control apparatuses 321 and 322. The diagonal hatching in FIG. 9 indicates the surface area of the black drawing paper 310 and does not indicate the cross section.

Each of the openings 311 and 312 formed in the black drawing paper 310 is a square having a side of 50 mm, and functions to expose a surface portion of a liquid crystal light control film of each of the liquid crystal light control apparatuses 321 and 322. The opening 311 and the opening 312 are arranged at a distance of 100 mm. The liquid crystal light control apparatuses 321 and 322 are the same apparatus that includes a normally dark liquid crystal light control film having the "transmittance-voltage characteristics" illustrated in FIG. 7, and have a light-shielding property in which the light transmittance (transmittance of light from backlight 330 disposed behind apparatuses) is 0% when no voltage is applied. When the voltage applied to the liquid crystal light control film increases, the transmittance gradually increases and when the applied voltage is 10 V, the transmittance reaches 33%, as illustrated in the graph of FIG. 7.

The liquid crystal light control film (liquid crystal light control cell) used in the liquid crystal light control apparatuses 321 and 322 has an area that is approximately equal to the area of the openings 311 and 312 (about 50 mm-square), and is not a large film to which the present invention is applied. Consequently, the connection terminal supply voltage Vin supplied from the power supply device is basically applied as it is to the entire surface of the liquid crystal light control cell, and no voltage drop occurs. The purpose of the experiment to be conducted is to determine whether or not the influence of an intentional drop in an applied voltage is recognizable to an observer using a conventional small liquid crystal light control cell.

The backlight 330 (not illustrated in FIG. 9) that illuminates from the back surface of the liquid crystal light control film is a lighting device including an LED and a resin diffusion plate, and has a function of illuminating with illumination light close to white with a brightness of 2000 cd/m$^2$. When the observer observes the influence measurement device 300 from the front, the observer can recognize the liquid crystal light control films of the liquid crystal light control apparatuses 321 and 322 in the two openings 311 and 312, respectively. As the voltage applied to the liquid crystal light control film increases, the observer can recognize that the white illumination light transmits through the openings 311 and 312.

FIG. 10 is a side view (portion of black drawing paper 310 is side sectional view) illustrating a specific measurement method using the influence measurement device 300 illustrated in FIG. 9. As described above, the black drawing paper 310 has the openings 311 and 312, and the liquid crystal light control apparatuses 321 and 322 are respectively attached to the back side of the openings 311 and 312 (opening 312 and liquid crystal light control device 322 are disposed on inner side, and thus are not illustrated in FIG. 10). The backlight 330 is disposed behind each of the liquid crystal light control apparatuses 321 and 322.

The following experiment was conducted in an environment in which the influence measurement device 300 was installed in a room with white wallpaper and a subject 400 was seated at a position 3 m away from the front of the influence measurement device 300 as illustrated in FIG. 10. The influence measurement device 300 and the subject 400 are illuminated with an illuminance of 1000 lx by a daylight fluorescent lamp 340 installed on the ceiling of the room. Further, the fluorescent lamp 340 is adjusted so as not to be reflected on the liquid crystal light control film surfaces of the liquid crystal light control apparatuses 321 and 322 when the subject 400 performs an observation.

The experiment was conducted according to the following procedure. First, one of the paired liquid crystal light control apparatuses 321 and 322 is determined as a reference device and the other is determined as a comparison device. The reference device is always driven with a rectangular wave AC having a peak voltage of 8 V and a frequency of 60 Hz, whereas the comparison device is driven with a rectangular wave AC having a peak voltage of "$8/(\alpha+1)$" V and a frequency of 60 Hz. Moreover, driving is performed while the value of the coefficient $\alpha$ is changed for each measurement. In each measurement, for two seconds, the backlight 330 is turned and at the same time, the liquid crystal light control apparatuses 321 and 322 are driven by AC signals having a predetermined voltage. Immediately after the backlight 330 is turned off, the subject 400 is asked whether the difference in brightness can be recognized when comparing the left opening 311 with the right opening 312. When the subject 400 can recognize the difference in brightness, the subject 400 is asked which is brighter.

Such a measurement was performed by using the liquid crystal light control apparatus 321 on the left side as a reference device and the liquid crystal light control apparatus 322 on the right side as a comparison device, and then swapping the left side and right side and using the liquid crystal light control apparatus 321 on the left side as a comparison device and the liquid crystal light control apparatus 322 on the right side as a reference device. The measurement was performed repeatedly by changing the value of the coefficient $\alpha$ in the range of $\alpha=0$ to 0.3 at intervals of 0.01 (however, at intervals of 0.05 in range of 0 to 0.1).

FIG. 11 is a graph illustrating a relationship between the coefficient $\alpha$ and a brightness difference identification rate $\beta$ where the ratio of the number of people who can recognize the difference in brightness between the left side and the right side when the above measurement is performed on ten subjects 400 is defined as the brightness difference identification rate $\beta$ (unit %). That is, the brightness difference identification rate $\beta$ is illustrated when $\alpha$="0", "0.05", "0.10", "0.11", "0.12", . . . , "0.30". A voltage of 8 V is always applied to the reference device, whereas a voltage of "$8/(\alpha+1)$" V is applied to the comparison device, that is, different voltages are applied at each measurement, such as 8 V when $\alpha=0$, 7.62 V when $\alpha=0.05$, 7.27 V when $\alpha=0.10$, 7.20 V when $\alpha=0.11$, . . . , 6.15 V when $\alpha=0.30$.

Here, the reason why a voltage of "$8/(\alpha+1)$" V is applied to the comparison device is that applying a voltage of "$8/(\alpha+1)$" V to the comparison device is equivalent to applying a voltage to the comparison device using a power supply device having an output impedance |Z0| that is |Z0|=$\alpha\times$RF. In the expression |Z0|=$\alpha\times$RF, RF is the DC resistance of the liquid crystal light control film, and an impedance |ZF| of the liquid crystal light control film in view of AC is actually |ZF|≤RF. However, in the ideal state as illustrated in FIG. 3(a), the value of |ZF| is almost equal to RF, except for a small timing before and after phase inversion, and no problem occurs when |ZF|=RF. When the output impedance |Z0| of the power supply device is compared with the impedance |ZF| of the liquid crystal light control film, the voltage actually applied to the liquid crystal light control film increases as the value of |Z0|/|ZF| (that is, value of |Z0|/RF) decreases.

The experiment described above thus adopts a method for applying a voltage of "$8/(\alpha+1)$" V to the comparison device and gradually changing the value of $\alpha$ in order to obtain the value of a of the comparison device in which the difference in brightness is recognized with respect to the reference device ($\alpha$=0) in the expression "|Z0|=$\alpha$×RF". When $\alpha$=0, a voltage of 8 V is applied to the comparison device and the reference device. However, as the value of a gradually increases, the voltage applied to the comparison device gradually decreases from 8V. When $\alpha$=1, a voltage of "8/(1+1)"=4 V is applied to the comparison device, which indicates that, based on the expression "|Z0|=1×RF", the output impedance |Z0| of the power supply device causes a voltage drop of 4 V and the DC resistance RF of the liquid crystal light control film causes a voltage drop of 4 V in 8 V of the ideal power supply. Consequently, for an arbitrary value of a, applying a voltage of "8/($\alpha$+1)" V to the comparison device is equivalent to supplying a voltage of 8 V from the ideal power supply of the power supply device with the output impedance |Z0| represented by the expression "|Z0|=$\alpha$×RF" to the comparison device. As a result, the measurement performed by the experiment described above is equivalent to the measurement of the brightness difference identification rate when the value of the output impedance |Z0| of the power supply device is changed by changing the parameter a in the expression "|Z0|=$\alpha$×RF".

As illustrated in the characteristic graph of FIG. 7, in this liquid crystal light control apparatus, when a voltage higher than or equal to 8V is applied, the transmittance has the maximum transmittance close to 33%. The graph of FIG. 11 is thus referred to as a graph "at the time of being driven with the maximum voltage". "At the time of being driven with the maximum voltage", the reference device has the maximum transmittance in design. It can be found from the graph of FIG. 11 that when the coefficient $\alpha$ is $\alpha \leq 0.2$, the brightness difference identification rate $\beta$ is extremely low, and many subjects 400 cannot recognize the difference in brightness. On the other hand, when the coefficient $\alpha$ exceeds 0.2, the brightness difference identification rate $\beta$ rapidly increases, and it can be found that many subjects 400 can recognize the difference in brightness.

As a result, in the conditional expression "|Z0|≤$\alpha$×RF" that defines the upper limit value of the output impedance |Z0| described in § 3, when the proportional coefficient $\alpha$ is set to $\alpha$=0.2, the upper limit value of the output impedance |Z0| is 0.2×RF. As described above, in order to take sufficient safety measures for the power supply device 110, the larger the value of the output impedance |Z0| is, the more preferable it is. However, in view of the experimental results illustrated in the graph of FIG. 11, when the value of |Z0| exceeds 0.2×RF, an applied voltage drop causes a difference in brightness that can be recognized by an observer at the time of being driven with the maximum voltage.

In other words, at the time of being driven with the maximum voltage, if the value of the output impedance |Z0| satisfies the conditional expression "|Z0|≤0.2×RF", no difference in brightness that can be recognized by the observer appears. The coefficient $\alpha$=0.2 indicated in § 3 is the value supported by such experimental results, and if the value of the output impedance |Z0| of the power supply device 110 satisfies |Z0|≤0.2×RF, it is possible to sufficiently control the transmittance of the liquid crystal light control film 120 at the time of being driven with the maximum voltage.

On the other hand, the graph illustrated in FIG. 12 is a graph illustrating the relationship between the coefficient $\alpha$ and the brightness difference identification rate $\beta$, similarly to the graph illustrated in FIG. 11. While the peak voltage of a reference AC signal is 8V in the experiment for obtaining the graph illustrated in FIG. 11, the peak voltage of the reference AC signal is 5V in the experiment for obtaining the graph illustrated in FIG. 12. That is, the graph illustrated in FIG. 12 illustrates measurement results similar to the graph illustrated in FIG. 11 when the reference device is always driven with a rectangular wave AC having a peak voltage of 5 V and a frequency of 60 Hz, whereas the comparative device is driven with a rectangular wave AC having a peak voltage of "5/($\alpha$+1)" V and a frequency of 60 Hz.

As illustrated in the characteristic graph of FIG. 7, in this liquid crystal light control apparatus, when a voltage of 5 V is applied, the transmittance has a transmittance that is intermediate in the entire varying range of 0 to 33%. The graph of FIG. 12 is thus referred to as a graph "at the time of being driven with an intermediate voltage". "At the time of being driven with an intermediate voltage", the reference device has an intermediate transmittance instead of the maximum transmittance in design. It can be found from the graph of FIG. 12 that when the coefficient $\alpha$ is a 0.05, the brightness difference identification rate $\beta$ is extremely low, and many subjects 400 cannot recognize the difference in brightness. On the other hand, when the coefficient $\alpha$ exceeds 0.05, the brightness difference identification rate $\beta$ rapidly increases, and it can be found that many subjects 400 can recognize the difference in brightness.

As a result, in the conditional expression "|Z0|≤$\alpha$×RF" that defines the upper limit value of the output impedance |Z0| described in § 3, when the proportional coefficient $\alpha$ is set to $\alpha$=0.05, the upper limit value of the output impedance |Z0| is 0.05×RF. As described above, in order to take sufficient safety measures for the power supply device 110, the larger the value of the output impedance |Z0| is, the more preferable it is. However, in view of the experimental results illustrated in the graph of FIG. 12, when the value of |Z0| exceeds 0.05×RF, an applied voltage drop causes a difference in brightness that can be recognized by an observer at the time of being driven with an intermediate voltage.

In other words, at the time of being driven with an intermediate voltage, if the value of the output impedance |Z0| satisfies the conditional expression "|Z0|≤0.05×RF", no difference in brightness that can be recognized by the observer appears. The coefficient $\alpha$=0.05 indicated in § 3 is the value supported by such experimental results, and if the value of the output impedance |Z0| of the power supply device 110 satisfies |Z0|≤0.05×RF, it is possible to sufficiently control the transmittance of the liquid crystal light control film 120 at the time of being driven with an intermediate voltage.

As described above, the characteristics at the time of being driven with the maximum voltage illustrated in FIG. 11 and the characteristics at the time of being driven with an intermediate voltage illustrated in FIG. 12 are different from each other, and in the former case, $\alpha$=0.2 can be obtained as the value of coefficient $\alpha$, and in the latter case, $\alpha$=0.05 is obtained as the value of the coefficient $\alpha$. That is, in the former case, it suffices that the upper limit value of the output impedance |Z0| is set to 0.2×RF, but in the latter case, the conditions become more severe and the upper limit value of the output impedance |Z0| needs to be set to 0.05×RF.

Here, the drive mode corresponding to the time of being driven with the maximum voltage is a drive mode used in an electronic shade or the like having a function of switching between two states, that is, a transmission state and a light shielding state. That is, the liquid crystal light control apparatus of the normally dark type is in the light shielding state when a voltage of 0V is applied and in the transmission state when a voltage of 8V is applied. The drive mode corresponding to the time of being driven with the maximum voltage may be adopted in an electronic shade that has only the function of switching between these two states, and thus it suffices that the upper limit value of the output impedance |Z0| of the power supply device is set to 0.2×RF.

On the other hand, the drive mode corresponding to the time of being driven with an intermediate voltage is a drive mode required for a light control apparatus capable of expressing gradations in which some intermediate steps are provided between the transmission state and the light shielding state. That is, the liquid crystal light control apparatus of the normally dark type is in the light shielding state when a voltage of 0V is applied, in the transmission state when a voltage of 8 V is applied, and in the intermediate state when a voltage of 5V is applied. The drive mode corresponding to the time of being driven with an intermediate voltage also has to be adopted in a light control apparatus that has the function of switching between multiple states, and thus the upper limit of the output impedance |Z0| of the power supply device needs to be set to 0.05×RF.

Consequently, in practice, the power supply device in which the output impedance |Z0| is less than or equal to "0.2×RF" may be used for products that have only the function of switching between two states (transmission state and light shielding state), and the power supply device in which the output impedance |Z0| is less than or equal to "0.05×RF" may be used for products that have the function of switching between multiple states, depending on a product provided as a liquid crystal light control apparatus.

The experiments for obtaining the graphs illustrated in FIGS. 11 and 12 were conducted using a liquid crystal light control cell that is an about 50 mm-square in shape, as described above. Specifically, in the liquid crystal light control cell used in these experiments, the liquid crystal layer 122 is formed of a layer that contains electric field-effect liquid crystal molecules (guest-host nematic liquid crystal (guest dye molecule: mixture of dichroic dyes such as azo dye and anthraquinone dye, host liquid crystal molecule: cyano or nitrogen nematic liquid crystal including those exhibiting chirality)) and has a thickness of 9 μm, and the first transparent electrode layer 121 and the second transparent electrode layer 123 are formed of a layer that is composed of ITO and has a thickness of 30 nm. The value of the DC resistance RF is 40 kΩ. Further, as in the example illustrated in FIG. 1, the liquid crystal light control cell is connected to the power supply device 110 at the film-side first connection terminal a and the film-side second connection terminal b provided at the edge of the cell.

The inventors of the present application also conducted the experiment described above on several different liquid crystal light control cells with different dimensions of the respective parts and different materials of liquid crystal (of course, with different values of DC resistance RF). As a result, graphs substantially similar to those in FIGS. 11 and 12 were obtained for all the liquid crystal light control cells. In particular, in the liquid crystal control cell using the guest-host nematic liquid crystal, graphs similar to those in FIGS. 11 and 12 were obtained. Further, a similar experiment was performed in which the AC signal supplied from the power supply device was changed from a rectangular wave to a sine wave and the frequency was changed from 60 Hz, but again similar graphs as those in FIGS. 11 and 12 were obtained.

It is thus presumed to be universal regardless of the size of each part of the liquid crystal light control cell, the type of liquid crystal, and a driving frequency that in the conditional expression "|Z0|≤α×RF" representing the upper limit value of the output impedance |Z0|, α=0.2 at the time of being driven with the maximum voltage and α=0.05 at the time of being driven with an intermediate voltage. This is probably because the conditional expression "|Z0|≤α×RF" represents the relationship between purely electrical numerical values, that is, between the output impedance |Z0| of the power supply device 110 and the DC resistance RF of the liquid crystal light control film, and is not directly related to various conditions such as the size of each part of the liquid crystal light control cell, the type of liquid crystal, and the driving frequency.

Therefore, in order to sufficiently control the transmittance so that an observer does not feel uncomfortable in the liquid crystal light control apparatus 100 including the liquid crystal light control film 120 and the power supply device 110 for driving the liquid crystal light control film 120, setting the output impedance |Z0| of the power supply device 110 so as to satisfy the condition |Z0|≤α×RF and setting the value of the coefficient α to α=0.2 at the time of being driven with the maximum voltage and to α=0.05 at the time of being driven with an intermediate voltage is considered to be universal conditions that can be widely applied to liquid crystal light control films having various forms.

<<<§ 5. Features of Method for Manufacturing Liquid Crystal Light Control Apparatus According to Present Invention>>>

Here, the present invention will be described as a method for manufacturing a liquid crystal light control apparatus. This manufacturing method is a method for manufacturing a liquid crystal light control apparatus that executes light control by changing the transmittance of liquid crystal, and is constituted by the following steps.

First, a light control film manufacturing step of manufacturing the liquid crystal light control film 120 is performed, where the liquid crystal light control film 120 includes the liquid crystal layer 122, the first transparent electrode layer 121 disposed on one surface (upper surface in example of FIG. 1) of the liquid crystal layer 122, the second transparent electrode layer 123 disposed on the other surface (lower surface in example of FIG. 1) of the liquid crystal layer 122, the film-side first connection terminal a provided at a predetermined position on the first transparent electrode layer 121, and the film-side second connection terminal b provided at a predetermined position on the second transparent electrode layer. Specifically, for example, the liquid crystal light control film 120 illustrated on the right side of FIG. 1 is manufactured. Since the specific procedure of the method for manufacturing such a liquid crystal light control film is known as in the case of a general method for manufacturing a liquid crystal light control cell, a detailed description thereof will be omitted here.

A DC resistance measuring step of measuring the DC resistance RF between the film-side first connection terminal a and the film-side second connection terminal b is then performed on the liquid crystal light control film 120 manufactured at the above step. Specifically, the DC resistance between the connection terminals a and b may be measured with a measurement device such as a tester.

Finally, a power supply device manufacturing step of manufacturing the power supply device 110 used for driving the liquid crystal light control film 120 manufactured at the above step is performed. Specifically, a power supply device that has a function of supplying a predetermined AC voltage between the power-supply-side first connection terminal A connected to the film-side first connection terminal a and the power-supply-side second connection terminal B connected to the film-side second connection terminal b may be manufactured. However, at this power supply device manufacturing step, it is designed so that the impedance between the power-supply-side first connection terminal A and the power-supply-side second connection terminal B, that is, the output impedance |Z0| of the power supply device 110 satisfies the condition $|Z0| \leq \alpha \times RF$ when the predetermined coefficient $\alpha$ is 0.2.

As described in § 4, the value of the coefficient $\alpha=0.2$ is a value that is to be used for a product that has only a function of switching between two states (transmission state and light shielding state), and a stricter value of coefficient $\alpha=0.05$ is used for a product that has a function of switching between multiple states.

In addition, in order to protect the power supply device 110 if a short circuit accident occurs in the liquid crystal layer 122, it is preferable to set the output impedance |Z0| of the power supply device 110 to a value as large as possible. Further, in order to reduce the manufacturing cost, it is preferable to set the output impedance |Z0| to a value as large as possible. Consequently, in practice, as explained in § 3, it is preferable to impose a condition for defining the lower limit value $Vp/Imax \leq |Z0|$ of the output impedance |Z0| on the power supply device 110 having a function of supplying an AC voltage having the peak voltage Vp with the maximum allowable current Imax. As a result, it is designed so that the output impedance |Z0| satisfies the condition of $Vp/Imax \leq |Z0| \leq \alpha \times RF$ (where $\alpha=0.2$ or 0.05).

In general, the power supply device is designed by determining the output impedance |Z0| to a desired rated value together with the peak voltage Vp and the maximum allowable current Imax, and combining electronic components suitable for these values by a method suitable for these values. It is needless to mention that, in some cases, if the prototype created based on the initial design does not meet the conditions, the power supply device is finally designed by trial and error while a correction process such as replacement of components is performed. Since a method for designing a power supply device that meets such rated values is a conventionally known method, a detailed description thereof will be omitted here.

<<<§ 6. Modifications Regarding Number and Arrangement of Film-Side Connection Terminals>>>

Modifications of the liquid crystal light control apparatus 100 according to the basic embodiment illustrated in FIG. 1 will be described in which the number and arrangement of film-side connection terminals are changed. In the case of the liquid crystal light control apparatus 100 according to the basic embodiment illustrated in FIG. 1, the film-side first connection terminal a is provided at the left edge of the upper surface of the first transparent electrode layer 121, and the film-side second connection terminal b is provided at the left edge of the lower surface of the second transparent electrode layer 123. Moreover, the film-side first connection terminal a and the film-side second connection terminal b are disposed at positions opposing each other. FIG. 13 is a plan view illustrating a basic example of the arrangement of such film-side connection terminals a and b.

That is, FIG. 13(a) is a top view of the first transparent electrode layer 121 (view of liquid crystal light control film 120 illustrated in FIG. 1 as viewed from above), whereas FIG. 13(b) is a bottom view of the second transparent electrode layer 123 (view of liquid crystal light control film 120 illustrated in FIG. 1 as viewed from below). The left side and the right side of the first transparent electrode layer 121 illustrated in FIG. 13(a) oppose the left side and the right side of the second transparent electrode layer 123 illustrated in FIG. 13(b), respectively. On the other hand, the upper side of the first transparent electrode layer 121 illustrated in FIG. 13(a) (inner side in FIG. 1) opposes the lower side of the second transparent electrode layer 123 illustrated in FIG. 13(b) (inner side in FIG. 1), the lower side of the first transparent electrode layer 121 illustrated in FIG. 13(a) (front side in FIG. 1) opposes the upper side of the second transparent electrode layer 123 illustrated in FIG. 13(b) (front side in FIG. 1).

In the case of the basic example illustrated in FIG. 13, as illustrated in FIG. 2(a), both the film-side first connection terminal a and the film-side second connection terminal b are provided at opposing positions on the left edge of the liquid crystal light control film 120. In the case of this basic example, wiring is performed from the power supply device 110 only to these two connection terminals a and b, and a voltage is directly applied only to the connection terminals a and b (distant points c and d illustrated in FIG. 2(a) are virtual points as described above, physical wiring is not performed on these distant points). As only the two terminals a and b are film-side connection terminals, the manufacturing cost of the liquid crystal light control film 120 can be reduced, and the merit of reducing the load of wiring work on the power supply device 110 can be achieved.

However, as illustrated in the equivalent circuit of FIG. 2(b), the first electrode layer resistance R1 is present between the two points a and c, and the second electrode layer resistance R2 is present between the two points b and d, and thus the value of the DC resistance RF of the liquid crystal light control film 120 is represented by the expression RF=R1+R2+RL, and the voltage Vend applied across the distant points c and d is lower than the voltage Vin applied across the connection terminals a and b. As the area of the liquid crystal light control film 120 increases, the degree of this voltage drop becomes remarkable as illustrated in FIG. 4.

FIG. 14 is a plan view illustrating a modification in which the number of the film-side connection terminals is increased to six. FIG. 14(a) is a top view of a first transparent electrode layer as in FIG. 13(a), and FIG. 14(b) is a top view of a second transparent electrode layer as in FIG. 13(b). A first transparent electrode layer 121A illustrated in FIG. 14(a) includes six sets of film-side first connection terminals a1 to a6, whereas a second transparent electrode layer 123B illustrated in FIG. 14 (b) also includes six sets of film-side second connection terminals b1 to b6. As illustrated in FIGS. 14(a) and 14(b), six sets of film-side first connection terminals a1 to a6 and six sets of film-side second connection terminals b1 to b6 are provided at the edge of the liquid crystal light control film 120, and the connection terminals a1 to a6 and the connection terminals b1 to b6 are respectively provided at positions opposed to each other (i-th (i=1, 2, . . . , 6) terminals ai and bi are disposed to vertically oppose each other).

Consequently, as a plurality of the film-side first connection terminals a1 to a6 and a plurality of the film-side second connection terminals b1 to b6 are provided, the distance between the connection terminals a and b and the distant points c and d illustrated in FIG. 2(b) becomes short, and thus the voltage drop due to the electrode layer resistances R1 and R2 can be reduced, and variations in transmittance depending on a position can be reduced.

As in the example illustrated in FIG. 14, when the film-side first connection terminals a1 to a6 and the film-side second connection terminals b1 to b6 are disposed at positions vertically opposed to each other (when disposed at symmetrical positions), an electric field can be efficiently generated vertically in the liquid crystal layer 122. However, in carrying out the present invention, the film-side first connection terminal and the film-side second connection terminal do not necessarily have to be disposed at positions vertically opposed to each other, and may be disposed at arbitrary positions (asymmetrical positions). Further, when the film-side first connection terminals and the film-side second connection terminals are not disposed at the opposing positions, the number of film-side first connection terminals does not need to be equal to the number of film-side second connection terminals.

FIG. 15 is a plan view illustrating a modification in which the number of film-side first connection terminals is different from the number of film-side second connection terminals. FIG. 15(a) is a top view of a first transparent electrode layer as in FIG. 14(a), and FIG. 15(b) is a top view of a second transparent electrode layer as in FIG. 14(b). The first transparent electrode layer 121A illustrated in FIG. 15(a) is exactly the same as the first transparent electrode layer 121A illustrated in FIG. 14(a), and has six sets of film-side first connection terminals a1 to a6 at the edge thereof. On the other hand, a first transparent electrode layer 123C illustrated in FIG. 15(b) has only a single film-side second connection terminal b0 at the center thereof.

In the case of the modification illustrated in FIG. 15, the connection terminals a1 to a6 and the connection terminal b0 are not in a positional relationship of opposing each other in a vertical direction, so that the vertical electric field cannot be efficiently generated in the liquid crystal layer 122. Further, the film-side second connection terminal b0 is provided at the center of the first transparent electrode layer 123C instead of the edge thereof, and when the liquid crystal light control film 120 is used by being adhered to a general window or the like, the presence of the first transparent electrode layer 123C becomes a factor that obstructs the field of view, and it is thus necessary to devise wiring for the power supply device 110. Consequently, the modification illustrated in FIG. 15 is not suitable for general applications, but can be used for special applications in which the film-side second connection terminal b0 needs to be provided at the central of the first transparent electrode layer 123C.

Eventually, in summarizing the modification illustrated in FIG. 14 and the modification illustrated in FIG. 15, it can be said that at least either the film-side first connection terminals a1 to a6 or the film-side second connection terminals b0 to b6 are provided at a plurality of positions on the liquid crystal light control film 120.

When a plurality of film-side first connection terminals and a plurality of film-side second connection terminals are provided, a series resistance between a point immediately before a wire from the power-supply-side first connection terminal A branches and a point immediately before a wire from the power-supply-side second connection terminal B branches may be used as the value of "DC resistance RF of liquid crystal light control film between film-side first connection terminal and film-side second connection terminal". For example, in the case of the modification illustrated in FIG. 14, a wire W1 from the power supply device 110 to the film-side first connection terminals a1 to a6 and a wire W2 from the power supply device 110 to the film-side second connection terminals b1 to b6 branch partway into six paths, as illustrated in FIG. 16. In this case, the value of the series resistance (value including resistances of wires branched) between a first point aa immediately before branching on the wire W1 and a second point bb immediately before branching on the wire W2 may be the DC resistance RF of the liquid crystal light control film 120. This is because a certain resistance is generated at a connection point to a transparent electrode layer such as ITO.

The conditional expression "$|Z0| \leq \alpha \times RF$" for the power supply device according to the present invention is an expression using the DC resistance RF as a parameter. For this reason, the number and arrangement of connection terminals are not parameters that directly affect the design conditions of the power supply device, but are parameters that affect the DC resistance RF, and thus indirectly influence the design conditions of the power supply device. In the case of a liquid crystal light control film using a general transparent electrode layer such as ITO, in the equivalent circuit of FIG. 2(b), the values of the resistances R1 and R2 are sufficiently smaller than the value of the resistance RL (R1,R2>>RL). Consequently, the value of the DC resistance RF of the liquid crystal light control film is largely controlled by the value of the liquid crystal layer resistance RL, and normally, does not change significantly even if the number and arrangement of the connection terminals are changed. Further, according to the experiment conducted by the inventors of the present application, even when the number and arrangement of the connection terminals were changed, no significant difference was found in the results illustrated in the graphs of FIGS. 11 and 12. Therefore, it is thus presumed to be universal regardless of the number and arrangement of the connection terminals that in the conditional expression "$|Z0| \leq \alpha \times RF$" representing the upper limit value of the output impedance $|Z0|$, $\alpha=0.2$ at the time of being driven with the maximum voltage and $\alpha=0.05$ at the time of being driven with an intermediate voltage.

While the examples of the liquid crystal light control apparatus using a guest-host (GH) drive system have been described, the present invention is also applicable to a liquid crystal light control apparatus using a drive system other than the GH system. Specifically, the present invention is applicable to liquid crystal light control apparatuses using drive systems such as a VA (vertical alignment) system, a TN (twisted nematic) system, an IPS (in plane switching) system, and an FFS (fringe field switching) system. In the case of liquid crystal light control apparatuses using these various drive systems, for the conditional expression "$|Z0| \leq \alpha \times RF$" representing the upper limit value of the output impedance $|Z0|$, $\alpha=0.2$ at the time of being driven with the maximum voltage and $\alpha=0.05$ at the time of being driven with an intermediate voltage as long as R1, R2<<RL described above is satisfied, and as a result of that, operations and effects unique to the present invention can be achieved.

INDUSTRIAL APPLICABILITY

The liquid crystal light control apparatus according to the present invention has a function of electrically controlling the transmittance of light by being adhered to various transparent members such as windows of buildings and automobiles, and can be widely used for blinds or shielding films.

REFERENCE SIGNS LIST 100 liquid crystal light control apparatus
110 power supply device
111 ideal power supply
112 output impedance
120 liquid crystal light control film
121, 121A first transparent electrode layer
122 liquid crystal layer
123, 123B, 123C second transparent electrode layer
200 voltmeter 300 influence measurement device of measuring influence of coefficient α
310 black drawing paper
311, 312 opening
321,322 liquid crystal light control apparatus
330 backlight
340 fluorescent lamp
400 subject
A power-supply-side first connection terminal
a, a1 to a6 film-side first connection terminal
aa first point immediately before branching
B power-supply-side second connection terminal
b, b0 to b6 film-side second connection terminal
bb second point immediately before branching
CL liquid crystal layer capacitance
c film-side first distant point
d film-side second distant point
R load resistance
R1 first electrode layer resistance
R2 second electrode layer resistance
RL liquid crystal layer resistance
RF DC resistance of liquid crystal light control film
W1, W2 wire from power supply device 110
V no-load power supply voltage
Vend distant terminal supply voltage
Vin connection terminal supply voltage
Vp peak voltage
Vr load power supply voltage
α proportional coefficient indicating ratio of RF to |Z0|
β brightness difference identification rate

The invention claimed is:

1. A liquid crystal light control apparatus that executes light control by changing a transmittance of liquid crystal, the liquid crystal light control apparatus comprising:
a liquid crystal light control film and a power supply device that drives the liquid crystal light control film, wherein
the liquid crystal light control film includes a liquid crystal layer, a first transparent electrode layer disposed on one surface of the liquid crystal layer, a second transparent electrode layer disposed on another surface of the liquid crystal layer, a film-side first connection terminal provided at a predetermined position on the first transparent electrode layer, and a film-side second connection terminal provided at a predetermined position on the second transparent electrode layer,
the power supply device has a function of supplying a predetermined AC voltage between a power-supply-side first connection terminal connected to the film-side first connection terminal and a power-supply-side second connection terminal connected to the film-side second connection terminal, and
a condition $|Z0| \leq \alpha \times RF$ is satisfied where RF is a DC resistance between the film-side first connection terminal and the film-side second connection terminal of the liquid crystal light control film, $|Z0|$ is an output impedance between the power-supply-side first connection terminal and the power-supply-side second connection terminal of the power supply device, and a value of a predetermined coefficient α is 0.2.

2. The liquid crystal light control apparatus according to claim 1, wherein
a condition $|Z0| \leq \alpha \times RF$ is satisfied when a value of a coefficient α is 0.05.

3. The liquid crystal light control apparatus according to claim 1, wherein
the power supply device has a function of supplying an AC voltage having a peak voltage Vp with a maximum allowable current Imax, and further a condition $Vp/Imax \leq |Z0| \leq \alpha \times RF$ is satisfied.

4. The liquid crystal light control apparatus according to claim 3, wherein
a liquid crystal light control film has a minimum transmittance and a maximum transmittance, when a power supply device does not supply a voltage, the liquid crystal light control film has one of the minimum transmittance and the maximum transmittance, and when the power supply device supplies an AC voltage having a peak voltage Vp, the liquid crystal light control film has another of the minimum transmittance and the maximum transmittance.

5. The liquid crystal light control apparatus according to claim 1, wherein
a film-side first connection terminal is provided at a predetermined position on an edge of a liquid crystal light control film, and a film-side second connection terminal is provided at a position opposing the predetermined position on the liquid crystal light control film.

6. The liquid crystal light control apparatus according to claim 1, wherein
at least one of a film-side first connection terminal and a film-side second connection terminal is provided at a plurality of positions on a liquid crystal light control film.

7. The liquid crystal light control apparatus according to claim 1, wherein
a liquid crystal light control film has an area suitable for being used by being adhered to a window used for exterior or interior of a building, a window of a vehicle, or glass for a showcase.

8. The liquid crystal light control apparatus according to claim 1, wherein
a liquid crystal light control film has an area more than or equal to 0.1 m$^2$.

9. The liquid crystal light control apparatus according to claim 1, wherein
a liquid crystal layer is composed of a layer containing field-effect liquid crystal molecules, and a first transparent electrode layer and a second transparent electrode layer are composed of a layer made of ITO.

10. A method for manufacturing a liquid crystal light control apparatus that executes light control by changing a transmittance of liquid crystal, the method comprising:
a light control film manufacturing step of manufacturing a liquid crystal light control film that includes a liquid crystal layer, a first transparent electrode layer disposed on one surface of the liquid crystal layer, a second transparent electrode layer disposed on another surface of the liquid crystal layer, a film-side first connection terminal provided at a predetermined position on the first transparent electrode layer, and a film-side second connection terminal provided at a predetermined position on the second transparent electrode layer;
a DC resistance measuring step of measuring a DC resistance RF between the film-side first connection terminal and the film-side second connection terminal; and
a power supply device manufacturing step of manufacturing a power supply device that has a function of supplying a predetermined AC voltage between a power-supply-side first connection terminal connected to the film-side first connection terminal and a power-supply-side second connection terminal connected to the film-side second connection terminal, wherein at the power supply device manufacturing step, it is designed that an output impedance $|Z0|$ between the power-supply-side first connection terminal and the power-supply-side second connection terminal of the power supply device satisfies a condition $|Z0| \leq \alpha \times RF$ when a value of a predetermined coefficient $\alpha$ is 0.2.

11. The method for manufacturing a liquid crystal light control apparatus according to claim 10, wherein at the power supply device manufacturing step, it is designed that a condition $|Z0| \leq \alpha \times RF$ is satisfied when a value of $\alpha$ coefficient $\alpha$ is 0.05.

12. The method for manufacturing a liquid crystal light control apparatus according to claim 10, wherein at the power supply device manufacturing step, it is designed to have a function of supplying an AC voltage having a peak voltage Vp with a maximum allowable current Imax, and further to satisfy a condition $Vp/Imax \leq |Z0| \leq \alpha \times RF$.

\* \* \* \* \*